(12) United States Patent
Nakazawa et al.

(10) Patent No.: US 12,235,424 B2
(45) Date of Patent: Feb. 25, 2025

(54) ZOOM LENS SYSTEM, IMAGE CAPTURE DEVICE, AND CAMERA SYSTEM

(71) Applicant: Panasonic Intellectual Property Management Co., Ltd., Osaka (JP)

(72) Inventors: Genki Nakazawa, Osaka (JP); Takao Yamanaka, Osaka (JP); Yoshiaki Kurioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 370 days.

(21) Appl. No.: 16/999,666

(22) Filed: Aug. 21, 2020

(65) Prior Publication Data

US 2021/0055531 A1 Feb. 25, 2021

(30) Foreign Application Priority Data

Aug. 22, 2019 (JP) .................................. 2019-152063

(51) Int. Cl.
*G02B 15/20* (2006.01)
*G02B 13/00* (2006.01)
(Continued)

(52) U.S. Cl.
CPC ........... *G02B 15/20* (2013.01); *G02B 13/009* (2013.01); *G02B 13/18* (2013.01); *G02B 15/1461* (2019.08); *G02B 15/22* (2013.01)

(58) Field of Classification Search
CPC ................................................. G02B 15/1461
See application file for complete search history.

(56) References Cited

U.S. PATENT DOCUMENTS 8,867,143 B2 * 10/2014 Taki ........................ G02B 15/16
 348/340
9,594,234 B2 * 3/2017 Iwasawa .............. G02B 15/173
(Continued)

FOREIGN PATENT DOCUMENTS

JP 2014089385 A * 5/2014
JP 2016-139125 8/2016
(Continued)

OTHER PUBLICATIONS

Notice of Reasons for Refusal dated Jan. 31, 2023 in corresponding Japanese Application No. 2019-152063 (with English translation).
(Continued)

*Primary Examiner* — Christopher Stanford
(74) *Attorney, Agent, or Firm* — Wenderoth, Lind & Ponack, L.L.P.

(57) ABSTRACT

A zoom lens system includes: a first lens group having positive power; a second lens group having negative power; a third lens group having positive power; a fourth lens group having positive power; a fifth lens group having negative power; and a following lens group following the fifth lens group. The first to fifth lens groups and the following lens group are arranged in this order such that the first lens group is located closest to an object and that the following lens group is located closest to an image. While the zoom lens system is zooming, intervals between the respective lens groups change. While the zoom lens system is focusing from an infinity focus point through a shortest shooting range, a plurality of negative lens groups included in the fifth lens group and the following lens group move.

13 Claims, 11 Drawing Sheets

(51) Int. Cl.
*G02B 13/18* (2006.01)
*G02B 15/14* (2006.01)
*G02B 15/22* (2006.01)

(56) References Cited

U.S. PATENT DOCUMENTS

| | | | |
|---|---|---|---|
| 10,955,644 B2 | 3/2021 | Kawamura et al. | |
| 2012/0050603 A1* | 3/2012 | Imaoka | H04N 23/55 359/683 |
| 2014/0139722 A1* | 5/2014 | Sugita | G02B 15/145113 359/684 |
| 2014/0146216 A1* | 5/2014 | Okumura | G02B 15/14 359/557 |
| 2014/0347524 A1* | 11/2014 | Iwasawa | G02B 7/08 348/240.3 |
| 2017/0261728 A1* | 9/2017 | Shibata | G02B 15/173 |
| 2018/0252895 A1 | 9/2018 | Hatada | |
| 2019/0271829 A1 | 9/2019 | Hatada | |
| 2022/0317425 A1 | 10/2022 | Machida | |

FOREIGN PATENT DOCUMENTS

| | | |
|---|---|---|
| JP | 2018-146739 | 9/2018 |
| JP | 2020-52338 | 4/2020 |
| WO | 2020/250672 | 12/2020 |

OTHER PUBLICATIONS

Final Notification of Reasons for Refusal dated Jun. 27, 2023 in corresponding Japanese Application No. 2019-152063 (with English translation).

Office Action issued Feb. 23, 2024 in U.S. Appl. No. 18/205,155.

* cited by examiner (a)

(b)

(c)

(a)

(b)

(c)

——— d-line
- - - - - F-line
— — — C-line

——— s
- - - - - m

ZOOM LENS SYSTEM, IMAGE CAPTURE DEVICE, AND CAMERA SYSTEM

CROSS-REFERENCE TO RELATED APPLICATION

This application is based on and claims the benefit of foreign priority to Japanese Patent Application No. 2019-152063 filed on Aug. 22, 2019, the entire disclosure of which is hereby incorporated by reference.

TECHNICAL FIELD

The present disclosure relates to a zoom lens system including a plurality of lens groups, and also relates to an image capture device and camera system including such a zoom lens system.

BACKGROUND ART

JP 2016-139125 A discloses a zoom lens system including: a first lens group having positive power; a second lens group having negative power; a third lens group having positive power; a fourth lens group having positive power; a fifth lens group having negative power; a sixth lens group having positive power; and a seventh lens group having negative power, where the first through seventh lens groups are arranged in this order such that the first lens group is located closer to an object than any other lens group and that the seventh lens group is located closer to an image than any other lens group. The zoom lens system performs focusing by moving the fifth lens group and the sixth lens group.

The present disclosure provides a zoom lens system in which various types of aberrations have been compensated for sufficiently and which exhibits improved shooting capability when the zoom lens system is focusing from an infinity focus point through a short range and also provides an image capture device and camera system including such a zoom lens system.

SUMMARY

A zoom lens system according to an aspect of the present disclosure includes a plurality of lens groups. The plurality of lens groups includes: a first lens group having positive power; a second lens group having negative power; a third lens group having positive power; a fourth lens group having positive power; a fifth lens group having negative power; and a following lens group following the fifth lens group. The first, second, third, fourth, and fifth lens groups and the following lens group are arranged in this order such that the first lens group is located closer to an object than any other lens group and that the following lens group is located closer to an image than any other lens group. While the zoom lens system is zooming, intervals between the plurality of lens groups change. While the zoom lens system is focusing from an infinity focus point through a shortest shooting range, a plurality of negative lens groups included in the fifth lens group and the following lens group move. The zoom lens system satisfies the following Inequality (1):

$$vd\_pG3G4 > 75 \tag{1}$$

where $vd\_pG3G4$ is a maximum value of respective abbe numbers of one or more positive lenses included in the third lens group and the fourth lens group.

A camera system according to the present disclosure includes an interchangeable lens unit and a camera body. The interchangeable lens unit includes the zoom lens system described above. The camera body includes a camera mount and an image sensor. The camera body is to be connected removably to the interchangeable lens unit via the camera mount. The image sensor receives an optical image formed by the zoom lens system and transforms the optical image into an electrical image signal. The interchangeable lens unit forms the optical image of the object on the image sensor.

An image capture device according to the present disclosure transforms an optical image of the object into an electrical image signal and displays and/or stores the image signal transformed. The image capture device includes the zoom lens system described above and an image sensor. The zoom lens system forms the optical image of the object. The image sensor transforms the optical image formed by the zoom lens system into the electrical image signal.

BRIEF DESCRIPTION OF DRAWINGS

The figures depict one or more implementation in accordance with the present teaching, by way of example only, not by way of limitations. In the figures, like reference numerals refer to the same or similar elements.

DESCRIPTION OF EMBODIMENTS

Embodiments of the present disclosure will be described in detail with reference to the accompanying drawings. Note that unnecessarily detailed description may be omitted. For example, detailed description of already well-known matters and redundant description of substantially the same configuration may be omitted. This is done to avoid making the following description overly redundant and to help one of ordinary skill in the art understand the present disclosure.

In addition, note that the accompanying drawings and the following description are provided to help one of ordinary skill in the art understand the present disclosure fully and should not be construed as limiting the scope of the present disclosure, which is defined by the appended claims.

Note that in a zoom lens system according to an exemplary embodiment, a "lens group" includes one or more lenses and an aperture stop. The lens group is configured such that those lenses move in a direction aligned with an optical axis independently of each other according to a shooting situation. That is to say, while the zoom lens system is focusing from an infinity focus point through a proximate object focused state, at least one lens group moves along the optical axis independently of the other lens groups. In addition, while the zoom lens system is zooming from a wide-angle end toward a telephoto end at an arbitrary shooting range from the infinity focus point to the shortest shooting range, zooming is performed with the intervals between the respective lens groups changed.

First to Third Embodiments

Figure 1:
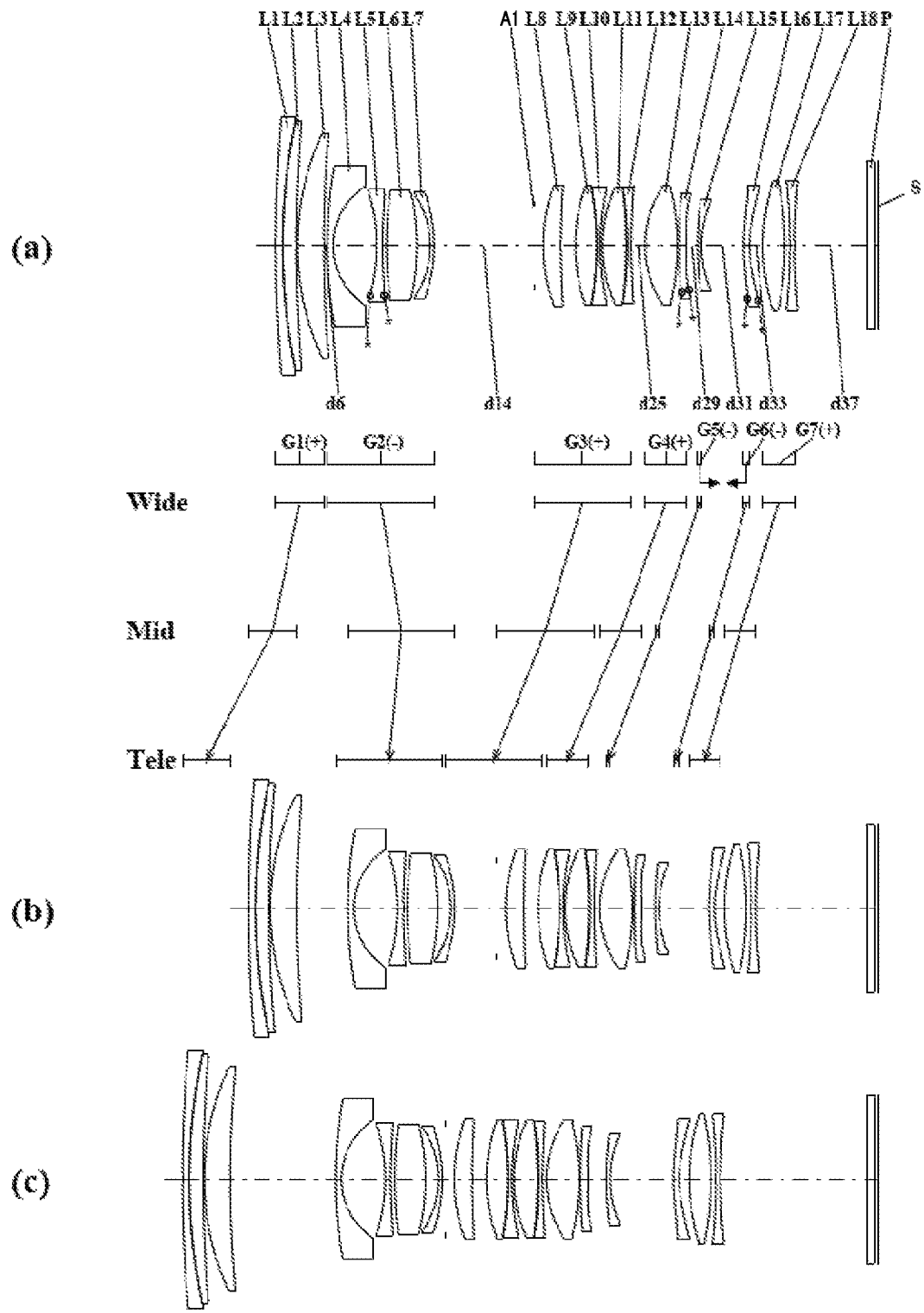
FIG. 1 illustrates lens arrangements showing what state a zoom lens system according to a first embodiment (corresponding to a first example of numerical values) assumes at an infinity focus point.
Figure 4:
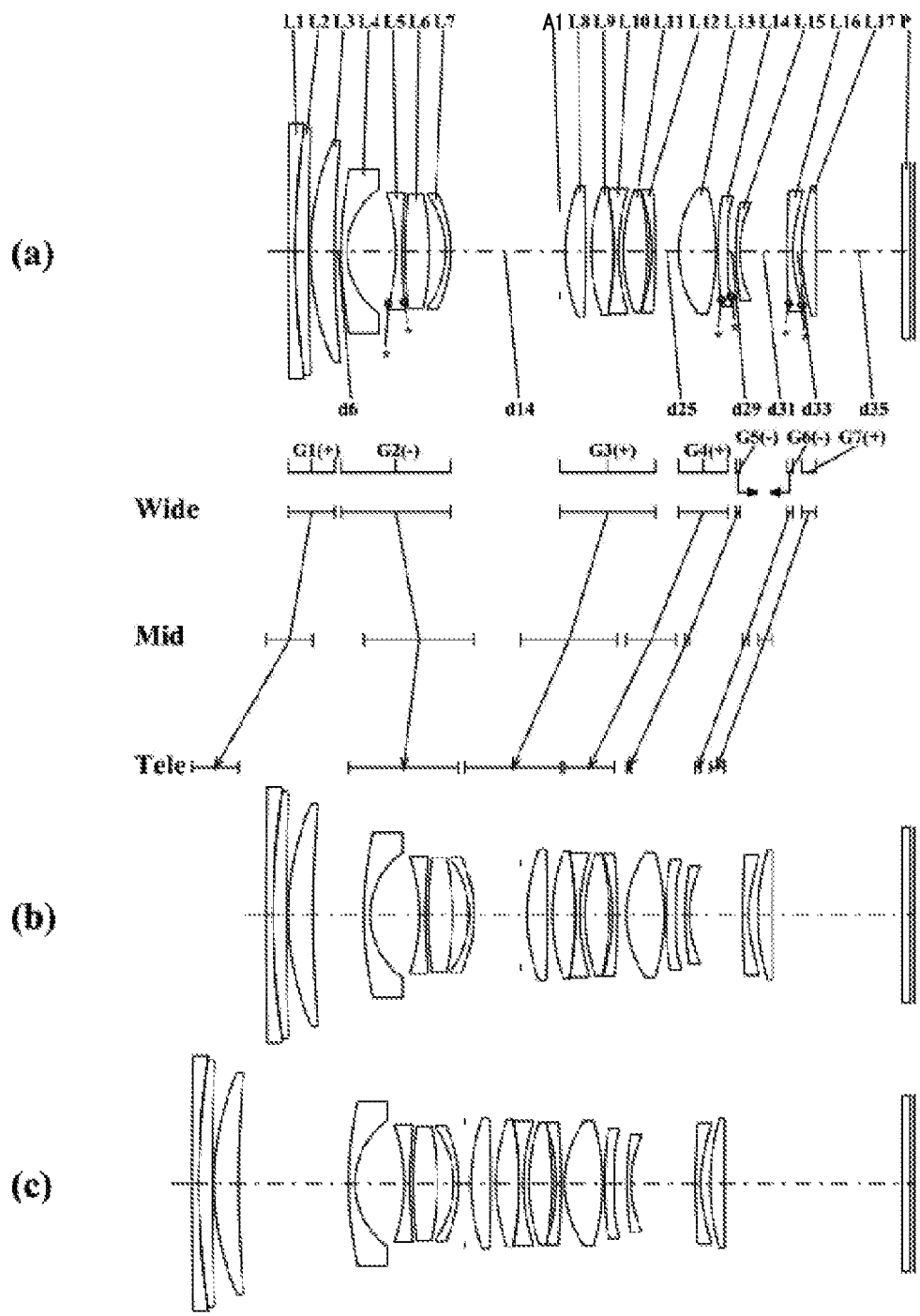
FIG. 4 illustrates lens arrangements showing what state a zoom lens system according to a second embodiment (corresponding to a second example of numerical values) assumes at an infinity focus point.
Figure 7:
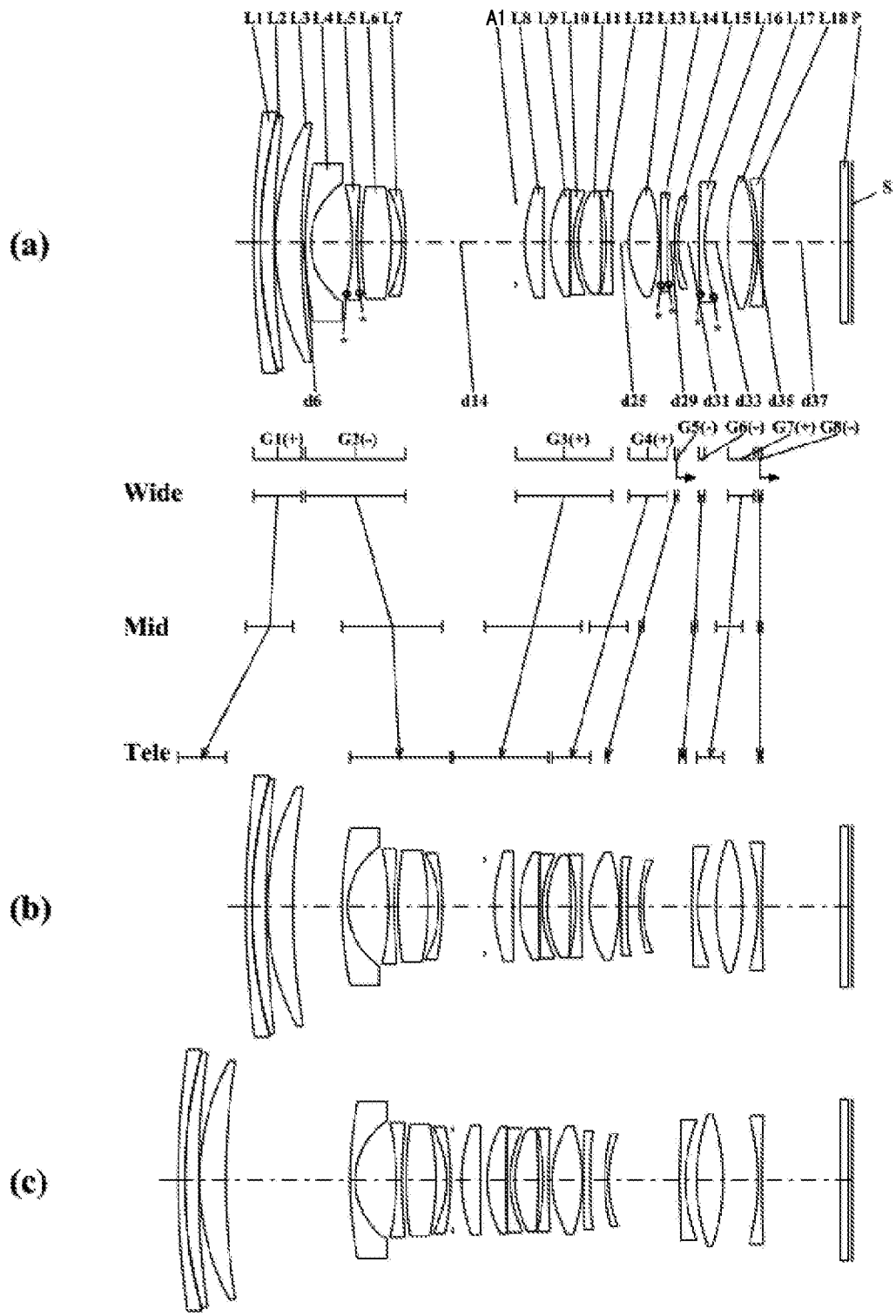
FIG. 7 illustrates lens arrangements showing what state a zoom lens system according to a third embodiment (corresponding to a third example of numerical values) assumes at an infinity focus point.

FIGS. 1, 4, and 7 illustrate lens arrangement diagrams of zoom lens systems according to first, second, and third embodiments, each showing what state a zoom lens system assumes at an infinity focus point.

In FIGS. 1, 4, and 7, portion (a) illustrates a lens arrangement at the wide-angle end (which is a state with the shortest focal length fW); portion (b) illustrates a lens arrangement at an intermediate position (which is a state with an intermediate focal length fM=√(fW*fT)); and portion (c) illustrates a lens arrangement at the telephoto end (which is a state with the longest focal length fT). Note that portions (a), (b), and (c) of FIGS. 1, 4, and 7 have the same aspect ratio.

Also, in FIGS. 1, 4, and 7, the polygon arrows shown between portions (a) and (b) thereof each connect together the respective positions of the lens groups at the wide-angle end (Wide), intermediate position (Mid), and telephoto end (Tele) from top to bottom. Note that in each of these drawings, these polygon arrows just connect the wide-angle end to the intermediate position and the intermediate position to the telephoto end with the lines, and do not indicate the actual movement of the lens group.

Also, the arrows added to the lens groups in FIGS. 1, 4, and 7 each indicate the direction of movement while the zoom lens system is focusing from the infinity focus point toward the shortest shooting range. Note that in FIGS. 1, 4, and 7, the signs indicating the powers of respective lens groups are shown under the respective lens groups in portion (a) thereof, and therefore, an arrow indicating focusing is shown under the sign indicating the power of each lens group for convenience sake. The directions of movement of the respective lens groups during focusing will be described more specifically later with respect to each of those embodiments.

Furthermore, in FIGS. 1, 4, and 7, the asterisk (*) attached to a particular surface indicates that the surface is an aspheric surface. Note that in the lenses included in each lens group, a surface with no asterisks is a spherical surface. Furthermore, the signs (+) and (−) added to the reference signs of the respective lens groups in FIGS. 1, 4, and 7 indicate the powers of the respective lens groups. Furthermore, in FIGS. 1, 4, and 7, the straight line drawn at the right end indicates the position of the image plane S (i.e., a surface, facing the object, of the image sensor). Furthermore, a parallel plate P shown on the left of the image plane S is a flat plate of glass having substantially no power and represents a cover glass of an image sensor or UV-IR cut glass, for example.

First Embodiment

FIG. 1 illustrates a zoom lens system according to a first embodiment.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having negative power; and a seventh lens group G7 having positive power. The sixth lens group G6 and the seventh lens group G7 are examples of following lens groups. The first lens group G1, the second lens group G2, the third lens group G3, the fourth lens group G4, the fifth lens group G5, the sixth lens group G6, and the seventh lens groups G7 are arranged in this order such that the first lens group G1 is located closer to an object than any other lens group and that the seventh lens group G7 is located closer to an image than any other lens group. Each of the first to seventh lens groups G1-G7 is a lens group. That is to say, the zoom lens system includes a plurality of lens groups. In this embodiment, the plurality of lens groups is made up of the first to seventh lens groups G1-G7.

The first lens group G1 includes: a first lens L1 having negative power; a second lens L2 having positive power; and a third lens L3 having positive power. In this embodiment, the first lens group G1 is made up of first to third lenses L1-L3. The first lens L1, the second lens L2, and the third lens L3 are arranged in this order such that the first lens L1 is located closer to the object than any other member of this first lens group G1 and that the third lens L3 is located closer to the image than any other member of this first lens group G1. The first lens L1 and the second lens L2 together form a bonded lens when bonded together with an adhesive, for example.

The second lens group G2 includes: a fourth lens L4 having negative power; a fifth lens L5 having negative power; a sixth lens L6 having positive power; and a seventh lens L7 having negative power. In this embodiment, the second lens group G2 is made up of fourth to seventh lenses L4-L7. The fourth lens L4, the fifth lens L5, the sixth lens L6, and the seventh lens L7 are arranged in this order such that the fourth lens L4 is located closer to the object than any other member of this second lens group G2 and that the seventh lens L7 is located closer to the image than any other member of this second lens group G2.

The third lens group G3 includes: an eighth lens L8 having positive power; a ninth lens L9 having positive power; a tenth lens L10 having negative power; an eleventh lens L11 having positive power; and a twelfth lens L12 having negative power. In this embodiment, the third lens group G3 is made up of eighth to twelfth lenses L8-L12. The eighth lens L8, the ninth lens L9, the tenth lens L10, the eleventh lens L11, and the twelfth lens L12 are arranged in this order such that the eighth lens L8 is located closer to the object than any other member of this third lens group G3 and that the twelfth lens L12 is located closer to the image than any other member of this third lens group G3. The ninth lens L9 and the tenth lens L10 together form a bonded lens when bonded together with an adhesive, for example.

The fourth lens group G4 includes a thirteenth lens L13 having positive power and a fourteenth lens L14 having positive power. In this embodiment, the fourth lens group G4 is made up of thirteenth and fourteenth lenses L13, L14. The thirteenth lens L13 and the fourteenth lens L14 are arranged in this order such that the thirteenth lens L13 is located closer to the object than the fourteenth lens L14 and that the fourteenth lens L14 is located closer to the image than the thirteenth lens L13.

The fifth lens group G5 includes a fifteenth lens L15 having negative power. In this embodiment, the fifth lens group G5 is made up of the fifteenth lens L15.

The sixth lens group G6 includes a sixteenth lens L16 having negative power. In this embodiment, the sixth lens group G6 is made up of the sixteenth lens L16.

The seventh lens group G7 includes a seventeenth lens L17 having positive power and an eighteenth lens L18 having negative power. In this embodiment, the seventh lens group G7 is made up of seventeenth and eighteenth lenses L17, L18. The seventeenth lens L17 and the eighteenth lens L18 are arranged in this order such that the seventeenth lens L17 is located closer to the object than the eighteenth lens L18 and that the eighteenth lens L18 is located closer to the image than the seventeenth lens L17.

The zoom lens system further includes an aperture stop A1. The aperture stop A1 is arranged between the seventh lens L7 of the second lens group G2 and the eighth lens L8 of the third lens group G3.

The respective lenses will be described.

First of all, the respective lenses that form the first lens group G1 will be described. The first lens L1 is a meniscus lens with a convex surface facing the object. The second lens L2 is a meniscus lens with a convex surface facing the object. The third lens L3 is a meniscus lens with a convex surface facing the object.

Next, the respective lenses that form the second lens group G2 will be described. The fourth lens L4 is a meniscus lens with a convex surface facing the object. The fifth lens L5 is a biconcave lens, both surfaces of which are aspheric surfaces. The sixth lens L6 is a biconvex lens. The seventh lens L7 is a meniscus lens with a concave surface facing the object.

Next, the respective lenses that form the third lens group G3 will be described. The eighth lens L8 is a meniscus lens with a convex surface facing the object. The ninth lens L9 is a biconvex lens having an abbe number of 81.6. The tenth lens L10 is a biconcave lens. The eleventh lens L11 is a biconvex lens having an abbe number of 81.6. The twelfth lens L12 is a biconcave lens.

Next, the respective lenses that form the fourth lens group G4 will be described. The thirteenth lens L13 is a biconvex lens having an abbe number of 75.5. The fourteenth lens L14 is a meniscus lens with a convex surface facing the object, both surfaces of which are aspheric surfaces.

Next, the respective lenses that form the fifth lens group G5 will be described. The fifteenth lens L15 is a meniscus lens with a convex surface facing the object.

Next, the respective lenses that form the sixth lens group G6 will be described. The sixteenth lens L16 is a meniscus lens with a convex surface facing the object, both surfaces of which are aspheric surfaces.

Next, the respective lenses that form the seventh lens group G7 will be described. The seventeenth lens L17 is a biconvex lens. The eighteenth lens L18 is a biconcave lens.

While the zoom lens system is zooming from the wide-angle end toward the telephoto end during a shooting session, the first lens group G1 moves toward the object. The second lens group G2 moves so as to draw a locus that is convex toward the image plane S. The aperture stop A1 and the third lens group G3 together move toward the object. The fourth lens group G4 moves toward the object. The fifth lens group G5 also moves toward the object. The sixth lens group G6 also moves toward the object. The seventh lens group G7 also moves toward the object.

In each of the plurality of lens groups, a plurality of lenses included in the lens group move together. For example, the first to third lenses L1-L3 included in the first lens group G1 move together.

In addition, as the zoom lens system is zooming, the interval between the plurality of lens groups change. More specifically, the plurality of lens groups move along the optical axis such that the interval between the first lens group G1 and the second lens group G2 increases; the interval between the second lens group G2 and the third lens group G3 decreases; the interval between the third lens group G3 and the fourth lens group G4 decreases; the interval between the fourth lens group G4 and the fifth lens group G5 increases; the interval between the fifth lens group G5 and the sixth lens group G6 increases; the interval between the sixth lens group G6 and the seventh lens group G7 decreases in the range from the wide-angle end through the intermediate position but increases in the range from the intermediate position through the telephoto end; and the interval between the seventh lens group G7 and the image plane S increases. At this time, while the zoom lens system is zooming from the wide-angle end toward the telephoto end, the aperture diameter of the aperture stop A1 increases in the range from the wide-angle end through the telephoto end.

While the zoom lens system is focusing from the infinity focus point toward the shortest shooting range, the fifth lens group G5 and the negative lens group (i.e., the lens group having negative power) included in the following lens groups move. More specifically, at this time, the fifth lens group G5 moves along the optical axis toward the image, the magnitude of its movement through focusing increases from the wide-angle end toward the telephoto end, the sixth lens group G6 moves along the optical axis toward the object, and the magnitude of its movement through focusing increases from the wide-angle end toward the telephoto end.

Second Embodiment

FIG. 4 illustrates a zoom lens system according to a second embodiment.

A zoom lens system according to the second embodiment does not include the eighteenth lens L18, which is a difference from the zoom lens system according to the first embodiment. The eighth lens L8 is a biconvex lens, which is another difference from the zoom lens system according to the first embodiment. The twelfth lens L12 is a meniscus lens with a concave surface facing the object, which is still another difference from the zoom lens system according to the first embodiment. The thirteenth lens L13 has an abbe number of 81.6, which is yet another difference from the zoom lens system according to the first embodiment. The seventeenth lens L17 is a meniscus lens with a convex surface facing the object, which is yet another difference from the zoom lens system according to the first embodiment. In the following description, description of constituent elements of the second embodiment having the same function as their counterparts of the first embodiment will be omitted as appropriate.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having negative power; and a seventh lens group G7 having positive power. The first, second, third, fourth, fifth, sixth, and seventh lens groups G1-G7 are arranged in this order such that the first lens group G1 is located closer to an object than any other lens group and that the seventh lens group G7 is located closer to an image than any other lens group. The sixth lens group G6 and the seventh lens group G7 are examples of following lens groups.

The first lens group G1 includes: a first lens L1 having negative power; a second lens L2 having positive power; and a third lens L3 having positive power, which are arranged in this order such that the first lens L1 is located closer to the object than any other member of this first lens group G1 and that the third lens L3 is located closer to the image than any other member of this first lens group G1. The first lens L1 and the second lens L2 together form a bonded lens when bonded together with an adhesive, for example.

The second lens group G2 includes: a fourth lens L4 having negative power; a fifth lens L5 having negative power; a sixth lens L6 having positive power; and a seventh lens L7 having negative power, which are arranged in this order such that the fourth lens L4 is located closer to the object than any other member of this second lens group G2 and that the seventh lens L7 is located closer to the image than any other member of this second lens group G2.

The third lens group G3 includes: an eighth lens L8 having positive power; a ninth lens L9 having positive power; a tenth lens L10 having negative power; an eleventh lens L11 having positive power; and a twelfth lens L12 having negative power, which are arranged in this order such that the eighth lens L8 is located closer to the object than any other member of this third lens group G3 and that the twelfth lens L12 is located closer to the image than any other member of this third lens group G3. The ninth lens L9 and the tenth lens L10 together form a bonded lens when bonded together with an adhesive, for example.

The fourth lens group G4 includes a thirteenth lens L13 having positive power and a fourteenth lens L14 having positive power.

The fifth lens group G5 includes a fifteenth lens L15 having negative power.

The sixth lens group G6 includes a sixteenth lens L16 having negative power.

The seventh lens group G7 includes a seventeenth lens L17 having positive power.

An aperture stop A1 is arranged between the seventh lens L7 of the second lens group G2 and the eighth lens L8 of the third lens group G3.

The respective lenses will be described.

First of all, the respective lenses that form the first lens group G1 will be described. The first lens L1 is a meniscus lens with a convex surface facing the object. The second lens L2 is a meniscus lens with a convex surface facing the object. The third lens L3 is a meniscus lens with a convex surface facing the object.

Next, the respective lenses that form the second lens group G2 will be described. The fourth lens L4 is a meniscus lens with a convex surface facing the object. The fifth lens L5 is a biconcave lens, both surfaces of which are aspheric surfaces. The sixth lens L6 is a biconvex lens. The seventh lens L7 is a meniscus lens with a concave surface facing the object.

Next, the respective lenses that form the third lens group G3 will be described. The eighth lens L8 is a biconvex lens. The ninth lens L9 is a biconvex lens having an abbe number of 81.6. The tenth lens L10 is a biconcave lens. The eleventh lens L11 is a biconvex lens having an abbe number of 81.6. The twelfth lens L12 is a meniscus lens having a concave surface facing the object.

Next, the respective lenses that form the fourth lens group G4 will be described. The thirteenth lens L13 is a biconvex lens having an abbe number of 81.6. The fourteenth lens L14 is a meniscus lens with a convex surface facing the object, both surfaces of which are aspheric surfaces.

Next, the respective lenses that form the fifth lens group G5 will be described. The fifteenth lens L15 is a meniscus lens with a convex surface facing the object.

Next, the respective lenses that form the sixth lens group G6 will be described. The sixteenth lens L16 is a meniscus lens with a convex surface facing the object, both surfaces of which are aspheric surfaces.

Next, the respective lenses that form the seventh lens group G7 will be described. The seventeenth lens L17 is a meniscus lens with a convex surface facing the object.

While the zoom lens system is zooming from the wide-angle end toward the telephoto end during a shooting session, the first lens group G1 moves toward the object. The second lens group G2 moves so as to draw a locus that is convex toward the image plane S. The aperture stop A1 and the third lens group G3 together move toward the object. The fourth lens group G4 moves toward the object. The fifth lens group G5 also moves toward the object. The sixth lens group G6 also moves toward the object. The seventh lens group G7 also moves toward the object.

In addition, as the zoom lens system is zooming, the plurality of lens groups move along the optical axis such that the interval between the first lens group G1 and the second lens group G2 increases; the interval between the second lens group G2 and the third lens group G3 decreases; the interval between the third lens group G3 and the fourth lens group G4 decreases; the interval between the fourth lens group G4 and the fifth lens group G5 increases; the interval between the fifth lens group G5 and the sixth lens group G6 increases; the interval between the sixth lens group G6 and the seventh lens group G7 is constant; and the interval between the seventh lens group G7 and the image plane S increases. At this time, while the zoom lens system is zooming from the wide-angle end toward the telephoto end, the aperture diameter of the aperture stop A1 increases in the range from the wide-angle end through the telephoto end.

While the zoom lens system is focusing from the infinity focus point toward the shortest shooting range, the fifth lens group G5 moves along the optical axis toward the image, the magnitude of its movement through focusing increases from the wide-angle end toward the telephoto end, the sixth lens group G6 moves along the optical axis toward the object, and the magnitude of its movement through focusing decreases from the wide-angle end through the intermediate position but increases from the intermediate position toward the telephoto end.

Third Embodiment

FIG. 7 illustrates a zoom lens system according to a third embodiment.

In a zoom lens system according to the third embodiment, the eighteenth lens L18 is included in the eighth lens group G8, not the seventh lens group G7, which is a difference from the zoom lens system according to the first embodiment. The ninth lens L9 is a meniscus lens with a convex surface facing the object, which is another difference from the first embodiment. The tenth lens L10 is a meniscus lens with a convex surface facing the object, which is still another difference from the first embodiment. In addition, while the zoom lens system is focusing, not the sixth lens group G6 but the eighth lens group G8 moves, which is yet another difference from the first embodiment. In the following description, description of constituent elements of the third embodiment having the same function as their counterparts of the first embodiment will be omitted as appropriate.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having negative power; a seventh lens group G7 having positive power; and an eighth lens group G8 having negative power. The first, second, third, fourth, fifth, sixth, seventh, and eighth lens groups G1-G8 are arranged in this order such that the first lens group G1 is located closer to an object than any other lens group and that the eighth lens group G8 is located closer to an image than any other lens group. The sixth lens group G6, the seventh lens group G7, and the eighth lens group G8 are examples of following lens groups.

The first lens group G1 includes: a first lens L1 having negative power; a second lens L2 having positive power; and a third lens L3 having positive power, which are arranged in this order such that the first lens L1 is located closer to the object than any other member of this first lens group G1 and that the third lens L3 is located closer to the image than any other member of this first lens group G1. The first lens L1 and the second lens L2 together form a bonded lens when bonded together with an adhesive, for example.

The second lens group G2 includes: a fourth lens L4 having negative power; a fifth lens L5 having negative power; a sixth lens L6 having positive power; and a seventh lens L7 having negative power, which are arranged in this order such that the fourth lens L4 is located closer to the object than any other member of this second lens group G2 and that the seventh lens L7 is located closer to the image than any other member of this second lens group G2.

The third lens group G3 includes: an eighth lens L8 having positive power; a ninth lens L9 having positive power; a tenth lens L10 having negative power; an eleventh lens L11 having positive power; and a twelfth lens L12 having negative power, which are arranged in this order such that the eighth lens L8 is located closer to the object than any other member of this third lens group G3 and that the twelfth lens L12 is located closer to the image than any other member of this third lens group G3. The ninth lens L9 and the tenth lens L10 together form a bonded lens when bonded together with an adhesive, for example.

The fourth lens group G4 includes a thirteenth lens L13 having positive power and a fourteenth lens L14 having positive power.

The fifth lens group G5 includes a fifteenth lens L15 having negative power.

The sixth lens group G6 includes a sixteenth lens L16 having negative power.

The seventh lens group G7 includes a seventeenth lens L17 having positive power.

The eighth lens group G8 includes an eighteenth lens L18 having negative power.

An aperture stop A1 is arranged between the seventh lens L7 of the second lens group G2 and the eighth lens L8 of the third lens group G3.

The respective lenses will be described.

First of all, the respective lenses that form the first lens group G1 will be described. The first lens L1 is a meniscus lens with a convex surface facing the object. The second lens L2 is a meniscus lens with a convex surface facing the object. The third lens L3 is a meniscus lens with a convex surface facing the object.

Next, the respective lenses that form the second lens group G2 will be described. The fourth lens L4 is a meniscus lens with a convex surface facing the object. The fifth lens L5 is a biconcave lens, both surfaces of which are aspheric surfaces. The sixth lens L6 is a biconvex lens. The seventh lens L7 is a meniscus lens with a concave surface facing the object.

Next, the respective lenses that form the third lens group G3 will be described. The eighth lens L8 is a meniscus lens with a convex surface facing the object. The ninth lens L9 is a meniscus lens with a convex surface facing the object and has an abbe number of 81.6. The tenth lens L10 is a meniscus lens with a convex surface facing the object. The eleventh lens L11 is a biconvex lens having an abbe number of 81.6. The twelfth lens L12 is a biconcave lens.

Next, the respective lenses that form the fourth lens group G4 will be described. The thirteenth lens L13 is a biconvex lens having an abbe number of 75.5. The fourteenth lens L14 is a meniscus lens with a convex surface facing the object, both surfaces of which are aspheric surfaces.

Next, the respective lenses that form the fifth lens group G5 will be described. The fifteenth lens L15 is a meniscus lens with a convex surface facing the object.

Next, the respective lenses that form the sixth lens group G6 will be described. The sixteenth lens L16 is a meniscus lens with a convex surface facing the object, both surfaces of which are aspheric surfaces.

Next, the respective lenses that form the seventh lens group G7 will be described. The seventeenth lens L17 is a biconvex lens.

Next, the respective lenses that form the eighth lens group G8 will be described. The eighteenth lens L18 is a biconcave lens.

While the zoom lens system is zooming from the wide-angle end toward the telephoto end during a shooting session, the first lens group G1 moves toward the object. The second lens group G2 moves toward the image. The aperture stop A1 and the third lens group G3 together move toward the object. The fourth lens group G4 moves toward the object. The fifth lens group G5 also moves toward the object. The sixth lens group G6 also moves toward the object. The seventh lens group G7 also moves toward the object. The eighth lens group G8 does not move.

In addition, as the zoom lens system is zooming, the plurality of lens groups move along the optical axis such that the interval between the first lens group G1 and the second lens group G2 increases; the interval between the second lens group G2 and the third lens group G3 decreases; the interval between the third lens group G3 and the fourth lens group G4 decreases; the interval between the fourth lens group G4 and the fifth lens group G5 increases; the interval between the fifth lens group G5 and the sixth lens group G6 increases; the interval between the sixth lens group G6 and the seventh lens group G7 decreases; the interval between the seventh lens group G7 and the eighth lens group G8 increases; and the interval between the eighth lens group G8 and the image plane S does not change. At this time, while the zoom lens system is zooming from the wide-angle end toward the telephoto end, the aperture diameter of the aperture stop A1 increases in the range from the wide-angle end through the telephoto end.

While the zoom lens system is focusing from the infinity focus point toward the shortest shooting range, the fifth lens group G5 moves along the optical axis toward the image, the magnitude of its movement through focusing increases from the wide-angle end toward the telephoto end, the eighth lens group G8 moves along the optical axis toward the image, and the magnitude of its movement through focusing increases from the wide-angle end toward the telephoto end.

(Conditions and Effects)

Next, conditions for implementing the zoom lens systems according to the first, second, and third embodiments, for example, will be described. That is to say, a plurality of possible conditions are defined for the zoom lens system according to each of these three embodiments. In that case, a zoom lens system, of which the configuration satisfies all of these possible conditions, is most advantageous. Alternatively, a zoom lens system that achieves its expected effects by satisfying the individual conditions to be described below may also be obtained.

A zoom lens system including a lens group in which the interval between adjacent lens groups changes during zooming and a lens group in which the interval between adjacent lens groups changes during focusing includes: a first lens group G1 having positive power, a second lens group G2 having negative power, a third lens group G3 having positive power, a fourth lens group G4 having positive power, a fifth lens group G5 having negative power, and following lens groups GR that follow the fifth lens group G5. The first to fifth lens groups G1-G5 and the following lens groups GR are arranged in this order such that the first lens group G1 is located closer to the object than any other lens group of this zoom lens system and that the following lens groups GR are located closer to the image than any other lens group of this zoom lens system. While the zoom lens system is focusing from the infinity focus point through the shortest shooting range, the fifth lens group G5 and the negative lens group included in the following lens groups GR move.

This configuration allows even a zoom lens having a large aperture to appropriately compensate for a significant negative variation in field curvature, caused while the shooting range is changed, by performing focusing using the fifth lens group G5 and the negative lens group included in the following lens groups GR thereof, while compensating for an excessive variation in spherical aberration caused in the second lens group G2 during zooming using the third and fourth lens groups G3, G4 following the second lens group G2.

The zoom lens system suitably satisfies the condition expressed by the following Inequality (1), for example:

$$vd\_pG3G4 > 75 \tag{1}$$

where $vd\_pG3G4$ is the maximum value of respective abbe numbers of one or more positive lenses included in the third lens group G3 and the fourth lens group G4. The positive lenses are lenses with positive power.

For example, in the first embodiment described above, the third lens group G3 includes, as positive lenses, the eighth lens L8, the ninth lens L9, and the eleventh lens L11. The fourth lens group G4 includes, as positive lenses, the thirteenth lens L13 and the fourteenth lens L14. $vd\_pG3G4$ is the maximum value of the respective abbe numbers of the eighth lens L8, the ninth lens L9, the eleventh lens L11, the thirteenth lens L13, and the fourteenth lens L14.

This Inequality (1) is a condition defining the abbe number of the positive lenses included in the third lens group G3 and the fourth lens group G4. Satisfying this Inequality (1) reduces the axial chromatic aberration over the entire zoom range.

To further enhance the effect described above, the zoom lens system suitably satisfies the following Inequality (1a):

$$vd\_pG3G4 > 80 \tag{1a}$$

Also, the third lens group G3, for example, suitably includes: a first lens having positive power; a second lens having positive power; a third lens having negative power; a fourth lens having positive power; and a fifth lens having negative power. The first, second, third, fourth, and fifth lenses are arranged in this order such that the first lens is located closer to the object than any other lens is. According to this configuration, the spherical aberration may be compensated for sufficiently using lenses having negative power with a so-called "under" spherical aberration (i.e., a spherical aberration that causes a focal point to be formed too close to the lens), caused by the lenses having positive power in the third lens group G3, reduced significantly.

Also, each of the at least two positive lenses included in the third lens group G3, for example, suitably satisfies the following Inequality (2):

$$vd\_pG3 > 75 \tag{2}$$

where $vd\_pG3$ is an abbe number of each of at least two positive lenses included in the third lens group G3.

This Inequality (2) is a condition defining the abbe number of the positive lenses included in the third lens group G3. If the abbe number were less than the lower limit defined by this Inequality (2), then the axial chromatic aberration would be compensated for insufficiently over the entire zoom range.

To further enhance the effect described above, the zoom lens system suitably satisfies the following Inequality (2a):

$$vd\_pG3 > 80 \tag{2a}$$

Furthermore, the lens located closest to the object in the third lens group G3, for example, suitably satisfies the following Inequality (3):

$$Nd\_G31 > 1.85 \tag{3}$$

where $Nd\_G31$ is a refractive index of the lens located closest to the object in the third lens group G3.

This Inequality (3) is a condition defining the refractive index of the lens located closest to the object in the third lens group G3. If the refractive index were less than the lower limit defined by Inequality (3), then the refraction at a point with a greater axial ray height would increase so much as to produce a significant negative spherical aberration.

To further enhance the effect described above, the zoom lens system suitably satisfies the following Inequality (3a):

$$Nd\_G31 > 1.90 \tag{3a}$$

Furthermore, the lens located closest to the object in the third lens group G3 and satisfying Inequality (3) is suitably a single lens with no bonding surface. This allows a lens with a high refractive index to be arranged at a point with a greater axial ray height such that the lens has two air surfaces. This reduces the chances of causing spherical aberration.

Also, while the zoom lens system is focusing from an infinity focus point through a shortest shooting range, the fifth lens group G5 having negative power may move toward the image, and the sixth lens group G6, having negative power, adjacent to the fifth lens group G5, and located closer to the image than the fifth lens group G5, may move toward the object. Alternatively, the fifth lens group G5 having the negative power may move toward the image and a lens group having negative power and located closer to the image than any other lens group in the zoom lens system (e.g., the sixth lens group G6 according to the first embodiment) may move toward the image. This allows the variation in aberration due to a change in shooting range to be compensated for sufficiently by distributing the variation in aberration in the two lens group having negative power.

Optionally, at least one lens group, out of the lens groups that move during focusing, may be constituted of a single lens. This allows the focus lens group to be lightened with the close-up shooting capability improved significantly.

Furthermore, the first lens L1 located closest to the object in the first lens group G1 and the second lens L2 adjacent to the first lens L1 and located closer to the image than the first lens L1, for example, suitably satisfy the following Inequality (4):

$$0.3 < TH\_L1L2/TH\_G1 < 0.55 \qquad (4)$$

where TH_L1L2 is an interval, measured along an optical axis, between a surface, facing the object, of the first lens L1 and a surface, facing the image, of the second lens L2, and TH_G1 is the thickness, measured along the optical axis, of the first lens group G1.

This Inequality (4) is a condition defining the ratio of the interval between the surface, facing the object, of the first lens L1 and the surface, facing the image, of the second lens L2 to the thickness, measured along the optical axis, of the first lens group G1.

If the ratio were less than the lower limit defined by this Inequality (4), then either the first lens L1 or the second lens L2 would be too thin to produce a lens with improved surface precision easily. On the other hand, if the ratio were greater than the upper limit defined by Inequality (4), then the light ray incident on the zoom lens system would be so high that the diameter of the filter and the diameter of the lens barrel would increase too significantly.

To further enhance the effect described above, the zoom lens system suitably satisfies at least one of the following Inequality (4a) or Inequality (4b):

$$0.4 < TH\_L1L2/TH\_G1 \qquad (4a)$$

$$TH\_L1L2/TH\_G1 < 0.5 \qquad (4b)$$

Furthermore, two focus lens groups moving during focusing, for example (e.g., the fifth lens group G5 and the sixth lens group G6 according to the first embodiment) suitably satisfy the following Inequality (5):

$$0.3 < f\_GR/f\_GF < 5.0 \qquad (5)$$

where f_GF is the focal length of the fifth lens group G5 and f_GR is the focal length of a lens group included in the following lens groups GR and moving during focusing.

Inequality (5) is a condition defining the focal lengths of lens groups that move during focusing. If the focal length ratio were less than the lower limit defined by Inequality (5), then the focal length of the fifth lens group G5 would be so long and the stroke during the focusing operation would increase so much that the overall size of the zoom lens system would increase significantly. On the other hand, if the focal length ratio were greater than the upper limit defined by Inequality (5), then the focal length of the fifth lens group G5 would be so short and the variation in aberration caused by the movement of the fifth lens group G5 from the infinity focus point through the shortest shooting range would be so significant that it would be difficult to compensate for the aberration sufficiently.

To further enhance the effect described above, the zoom lens system suitably satisfies at least one of the following Inequality (5a) or Inequality (5b):

$$0.4 < f\_GR/f\_GF \qquad (5a)$$

$$f\_GR/f\_GF < 4.0 \qquad (5b)$$

To further enhance the effect described above, the zoom lens system suitably satisfies at least one of the following Inequality (5c) or Inequality (5d):

$$0.8 < f\_GR/f\_GF \qquad (5c)$$

$$f\_GR/f\_GF < 2.5 \qquad (5d)$$

Furthermore, the air gap, as measured along the optical axis, between the third lens group G3 and the fourth lens group G4 that move during zooming, for example, suitably satisfies the following Inequality (6):

$$0.01 < TH\text{air}\_G3G4/fT < 0.30 \qquad (6)$$

where THair_G3G4 is an air gap, measured at the wide-angle end, between a surface located closest to the image in the third lens group G3 and a surface located closest to the object in the fourth lens group G4, and fT is the focal length of the zoom lens system at the telephoto end.

This Inequality (6) is a condition defining the an air gap, measured at the wide-angle end, between a surface located closest to the image in the third lens group G3 and a surface located closest to the object in the fourth lens group G4. If the ratio were less than the lower limit defined by this Inequality (6), then the air gap, measured at the wide-angle end, between the third lens group G3 and the fourth lens group G4 would be too narrow to reduce the negative field curvature. On the other hand, if the ratio were greater than the upper limit defined by this Inequality (6), then the air gap, measured at the wide-angle end, between the third lens group G3 and the fourth lens group G4 would be too broad to reduce the positive field curvature. Too broad an air gap would increase the overall size of the zoom lens system as well.

To further enhance the effect described above, the zoom lens system suitably satisfies at least one of the following Inequality (6a) or Inequality (6b):

$$0.03 < TH\text{air}\_G3G4/fT \qquad (6a)$$

$$TH\text{air}\_G3G4/fT < 0.20 \qquad (6b)$$

Furthermore, at least one surface of the lens located closest to the image in the fourth lens group G4, for example, is suitably an aspheric surface. This facilitates flattening the field curvature over the entire zoom range.

Furthermore, the lens located closest to the image in the zoom lens system (e.g., the eighteenth lens L18 in FIG. 1), for example, suitably satisfies the following Inequality (7):

$$0.05 < TH\_FB/L\_W < 0.5 \qquad (7)$$

where TH_FB is an interval between a surface, facing the image, of a lens located closest to the image in the lens group located closest to the image and an image plane S, and L_W is an interval, measured at the wide-angle end, from a lens surface located closest to the object to an image capturing plane.

Inequality (7) is a condition defining the interval between the image plane of the lens group located closest to the image in the zoom lens system and the image capturing plane.

If the ratio were less than the lower limit defined by Inequality (7), then the surface, facing the image, of the lens group located closest to the image in the zoom lens system would be too close to the image capturing plane to arrange a mechanism members to hold the lenses and the lens groups easily.

On the other hand, if the ratio were greater than the upper limit defined by Inequality (7), then the distance from the lens group in the zoom lens system to the image capturing plane would be so long that the overall size of the zoom lens system would increase significantly.

To further enhance the effect described above, the zoom lens system suitably satisfies at least one of the following Inequality (7a) or Inequality (7b):

$$0.10 < TH\_FB/L\_W \tag{7a}$$

$$TH\_FB/L\_W < 0.35 \tag{7b}$$

To further enhance the effect described above, the zoom lens system more suitably satisfies the following Inequality (7c):

$$TH\_FB/L\_W < 0.20 \tag{7c}$$

(Schematic Configuration for Image Capture Device to which First Embodiment is Applied)

Figure 10:
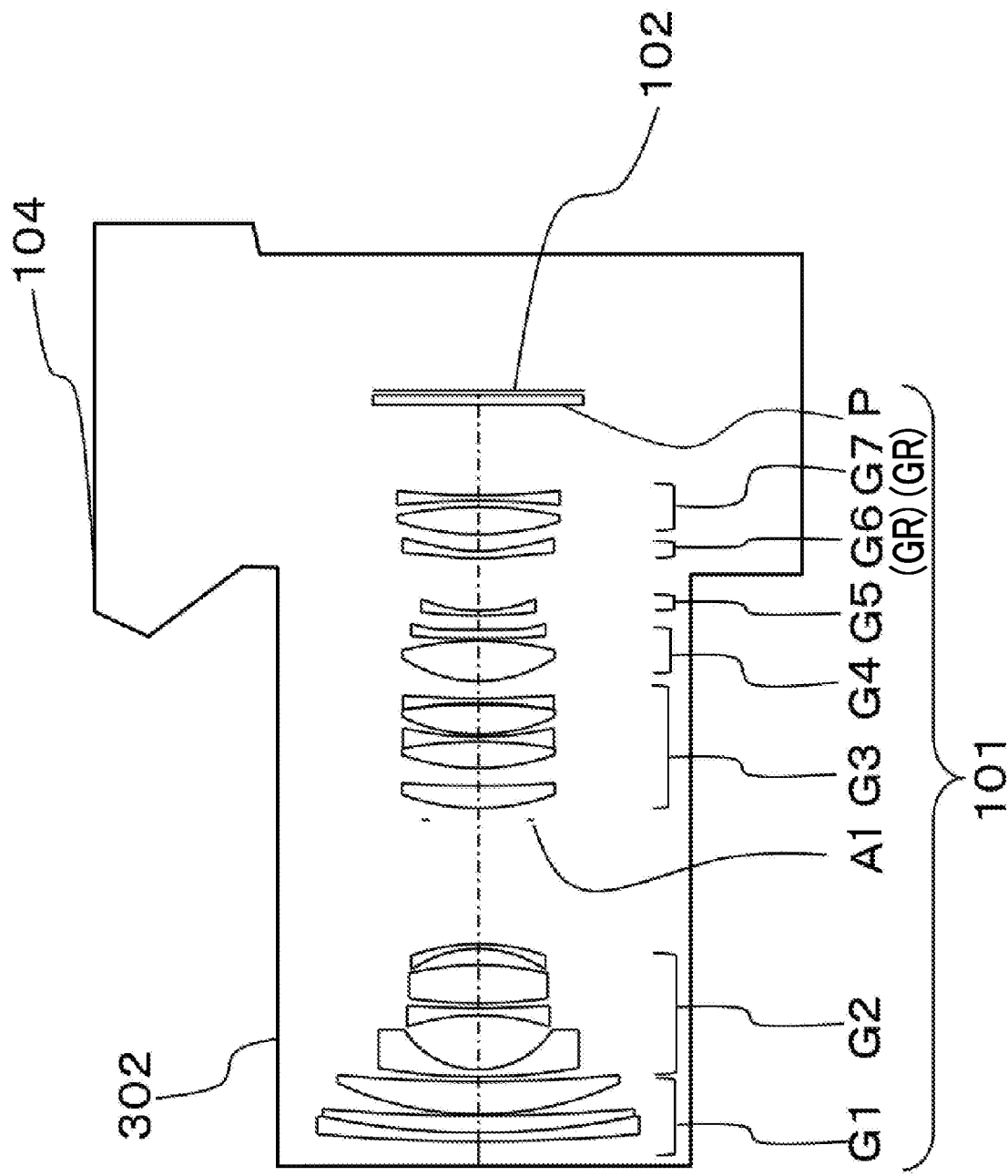
FIG. 10 illustrates a schematic configuration for a digital camera according to the first embodiment.

FIG. 10 illustrates a schematic configuration for an image capture device 100, to which the zoom lens system of the first embodiment is applied. Optionally, the zoom lens system according to the second or third embodiment is also applicable to the image capture device 100.

The image capture device 100 transforms an optical image of an object into an electrical image signal and displays and/or stores the image signal thus transformed. The image capture device 100 includes a housing 104, an image sensor 102, and the zoom lens system 101. The zoom lens system 101 forms an optical image of the object. The image sensor 102 transforms the optical image of the object, formed by the zoom lens system 101, into an electrical image signal. The housing 104 houses the image sensor 102 and the zoom lens system 101. The image capture device 100 may be implemented as a digital camera, for example.

The zoom lens system 101 includes the first lens group G1, the second lens group G2, the third lens group G3, the fourth lens group G4, the fifth lens group G5, the sixth lens group G6, and the seventh lens group G7.

The third lens group G3 includes the aperture stop A1.

The housing 104 includes a lens barrel 302. The lens barrel 302 holds the respective lens groups and the aperture stop A1 that form the zoom lens system 101.

The image sensor 102 is arranged at the image plane S of the zoom lens system according to the first embodiment.

In addition, an actuator, a lens frame, a cam, and other members housed in the housing 104 are arranged with respect to the zoom lens system 101 such that the first lens group G1, the second lens group G2, the third lens group G3, the fourth lens group G4, the fifth lens group G5, the sixth lens group G6, and the seventh lens group G7 move while the zoom lens system 101 is zooming and that the fifth lens group G5 and the sixth lens group G6 move while the zoom lens system 101 is focusing.

This provides a small-sized image capture device 100 in which various types of aberrations have been compensated for sufficiently.

In the example described above, the zoom lens system according to the first embodiment is applied to a digital camera. However, this is only an example and should not be construed as limiting. Alternatively, the zoom lens system is also applicable to a surveillance camera and various other types of image capture devices.

(Schematic Configuration for Camera System to which First Embodiment is Applied)

Figure 11:
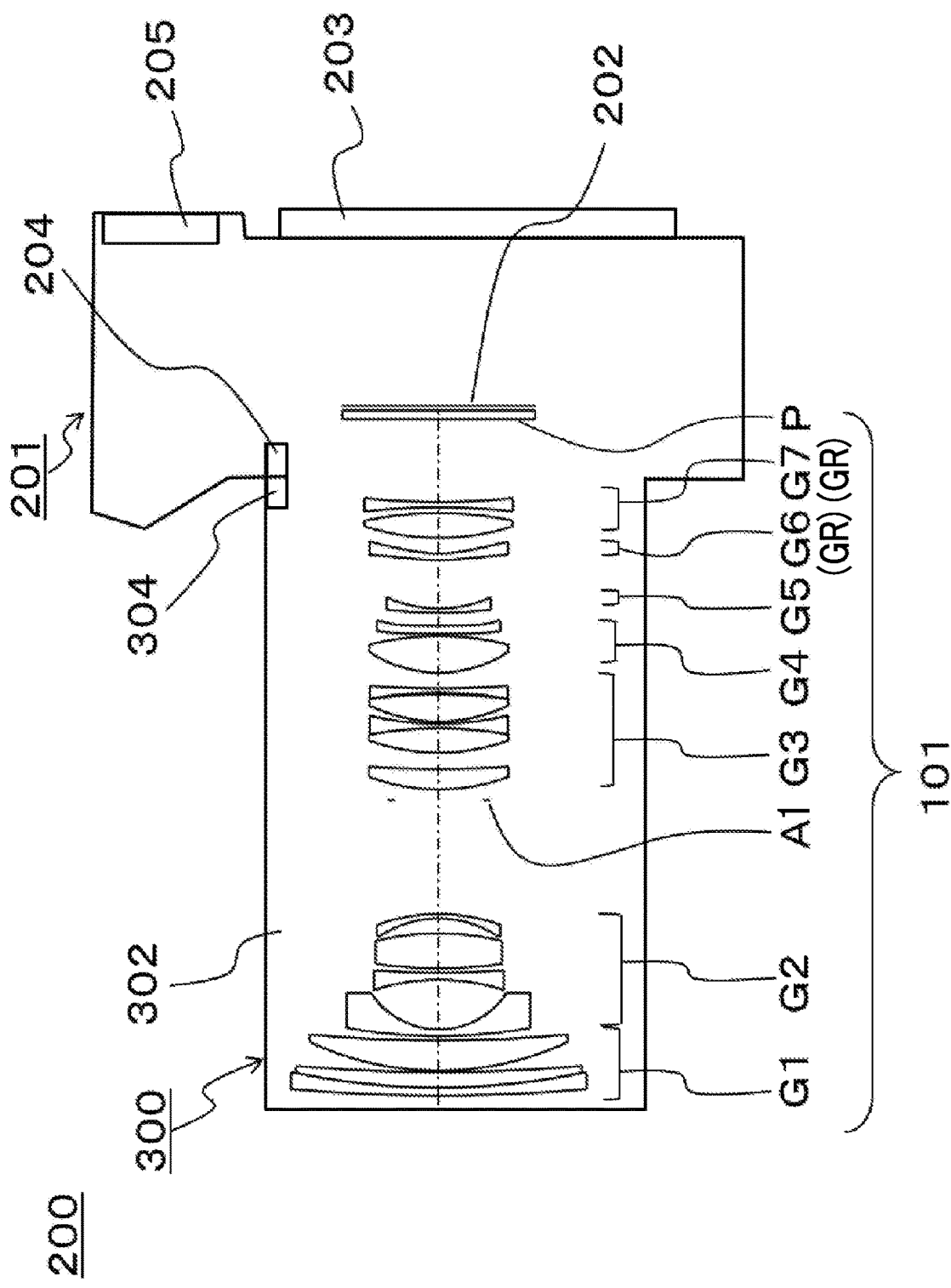
FIG. 11 illustrates a schematic configuration for a lens interchangeable digital camera according to the first embodiment.

FIG. 11 illustrates a schematic configuration for a camera system 200, to which the zoom lens system of the first embodiment is applied. Optionally, the zoom lens system according to the second or third embodiment is also applicable to the camera system 200.

The camera system 200 includes a camera body 201 and an interchangeable lens unit 300 to be connected removably to the camera body 201.

The camera body 201 includes an image sensor 202, a monitor 203, a memory to store an image signal, a camera mount 204, and a viewfinder 205. The image sensor 202 receives an optical image formed by the zoom lens system 101 of the interchangeable lens unit 300 and transforms the optical image into an electrical image signal. The monitor 203 displays the image signal transformed by the image sensor 202. The interchangeable lens unit 300 forms an optical image of the object on the image sensor 202 through the zoom lens system 101.

The interchangeable lens unit 300 includes the zoom lens system 101. Specifically, the interchangeable lens unit 300 includes the first lens group G1, the second lens group G2, the third lens group G3, the fourth lens group G4, the fifth lens group G5, the sixth lens group G6, and the seventh lens group G7.

The third lens group G3 includes the aperture stop A1.

The interchangeable lens unit 300 includes a lens barrel 302. The lens barrel 302 holds the respective lens groups and aperture stop A1 of the zoom lens system 101. The lens barrel 302 further includes a lens mount 304 to be connected to the camera mount 204 of the camera body 201.

The camera body 201 is to be connected removably to the interchangeable lens unit 300 via the camera mount 204. That is to say, connecting the camera mount 204 to the lens mount 304 of the interchangeable lens unit 300 allows the camera body 201 to be connected to the interchangeable lens unit 300. Also, removing the camera mount 204 from the lens mount 304 of the interchangeable lens unit 300 allows the camera body 201 to be removed from the interchangeable lens unit 300.

In this manner, the camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 serve as interfaces that allow the respective controllers of the camera mount 204 and the lens mount 304 to exchange signals with each other.

The camera system 200 includes at least the respective lens groups held by the lens barrel 302 and the camera body 201. In addition, the camera system 200 further includes an actuator, a lens frame, a cam, and other members to be controlled by the controller in the interchangeable lens unit 300 such that the first lens group G1, the second lens group G2, the third lens group G3, the fourth lens group G4, the fifth lens group G5, the sixth lens group G6, and the seventh lens group G7 move while the zoom lens system 101 is zooming and that the fifth lens group G5 and the sixth lens group G6 move while the zoom lens system 101 is focusing.

Other Embodiments

The first, second, and third embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

For example, in the first to third embodiments described above, the zoom lens system is supposed to be used in the entire zoom range. However, the zoom lens system does not have to be used in the entire zoom range. Alternatively, the zoom lens system may also be used selectively only in an extracted range where optical performance is ensured according to the desired zoom range. That is to say, the zoom lens system may also be used as a zoom lens system with lower zoom power than the zoom lens system to be described below for the first, second, and third examples of numerical values. Optionally, the zoom lens system may also be used selectively as a single-focus zoom lens system only at an extracted focal length where optical performance is ensured according to the desired zoom position.

Furthermore, in the first to third embodiments described above, each of the lens groups that form the zoom lens system is supposed to consist of only refractive lenses that deflect the incoming light ray through refraction (i.e., lenses of the type that deflects the incoming light ray at the interface between two media with mutually different refractive indices). However, this is only an example and should not be construed as limiting. Alternatively, each lens group may also include diffractive lenses that deflect the incoming light ray through diffraction and/or refractive-diffractive hybrid lenses that deflect the incoming light ray through a combination of diffraction and refraction actions. Still alternatively, each lens group may also be made up of refractive index distributed lenses that deflect the incoming light ray in accordance with the distribution of refractive indices in the medium. Among other things, a diffraction structure is suitably formed at the interface between two media with mutually different refractive indices in the diffractive-refractive hybrid lens, because the diffraction efficiency would depend on the wavelength much less heavily in that case.

This provides a camera system in which various types of aberrations have been compensated for sufficiently.

(Examples of Numerical Values)

Next, exemplary sets of specific numerical values that were actually adopted in the zoom lens systems with the configurations according to the first, second, and third embodiments will be described. Note that in the tables showing these exemplary sets of numerical values, the length is expressed in millimeters (mm), the angle of view is expressed in degrees)(°, r indicates the radius of curvature, d indicates the surface interval, nd indicates a refractive index with respect to a d-line, υd (also denoted as "vd") indicates an abbe number with respect to a d-line, and a surface with an asterisk (*) is an aspheric surface. The aspheric shape is defined by the following equation. Furthermore, in the exemplary sets of numerical values, the aperture diameter refers to an effective open aperture diameter (maximum aperture) at each zoom position:

$$Z = \frac{h^2/r}{1+\sqrt{1-(1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

Figure 2:
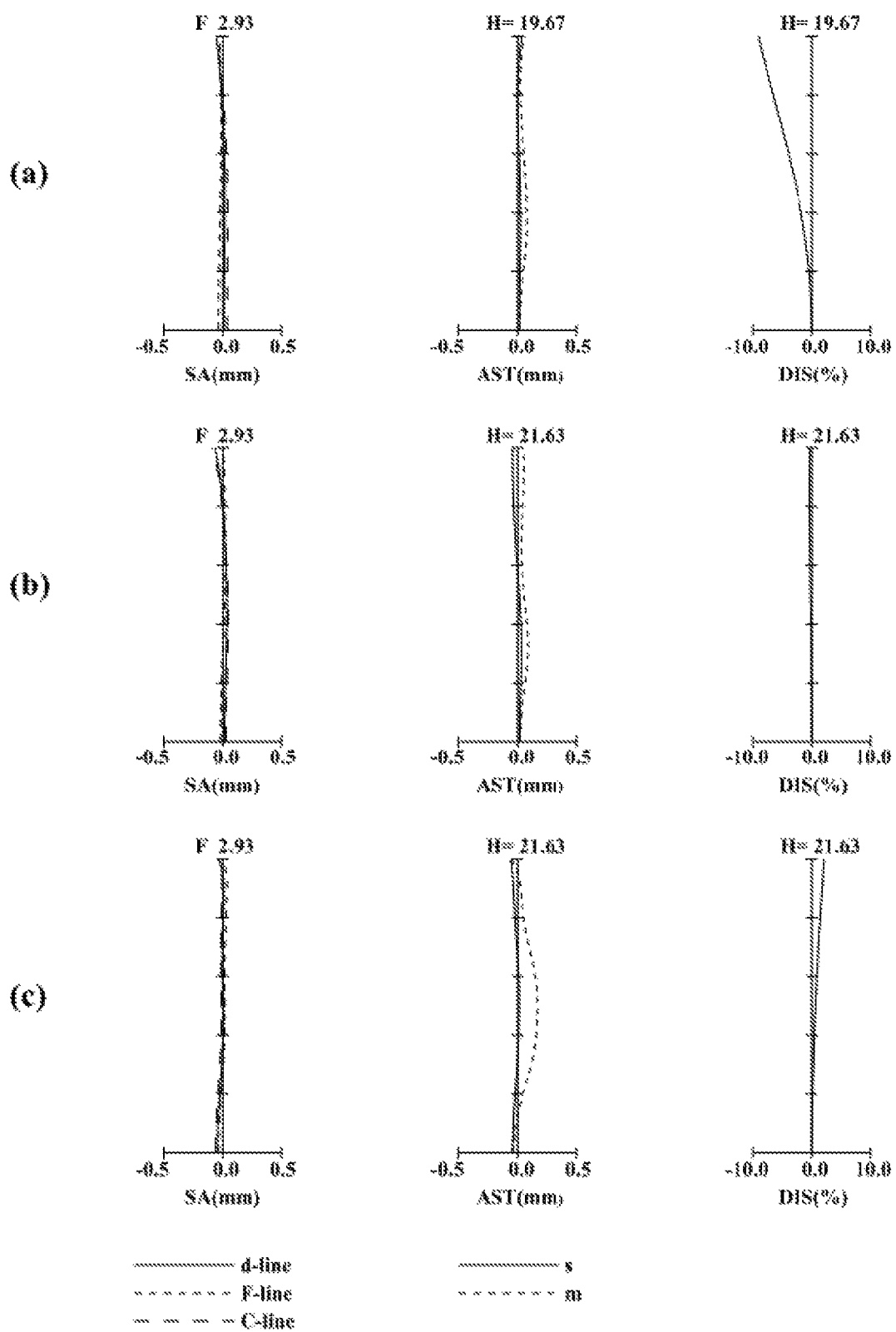
FIG. 2 illustrates longitudinal aberration diagrams showing what state the zoom lens system assumes at the infinity focus point in the first example of numerical values.
Figure 3:
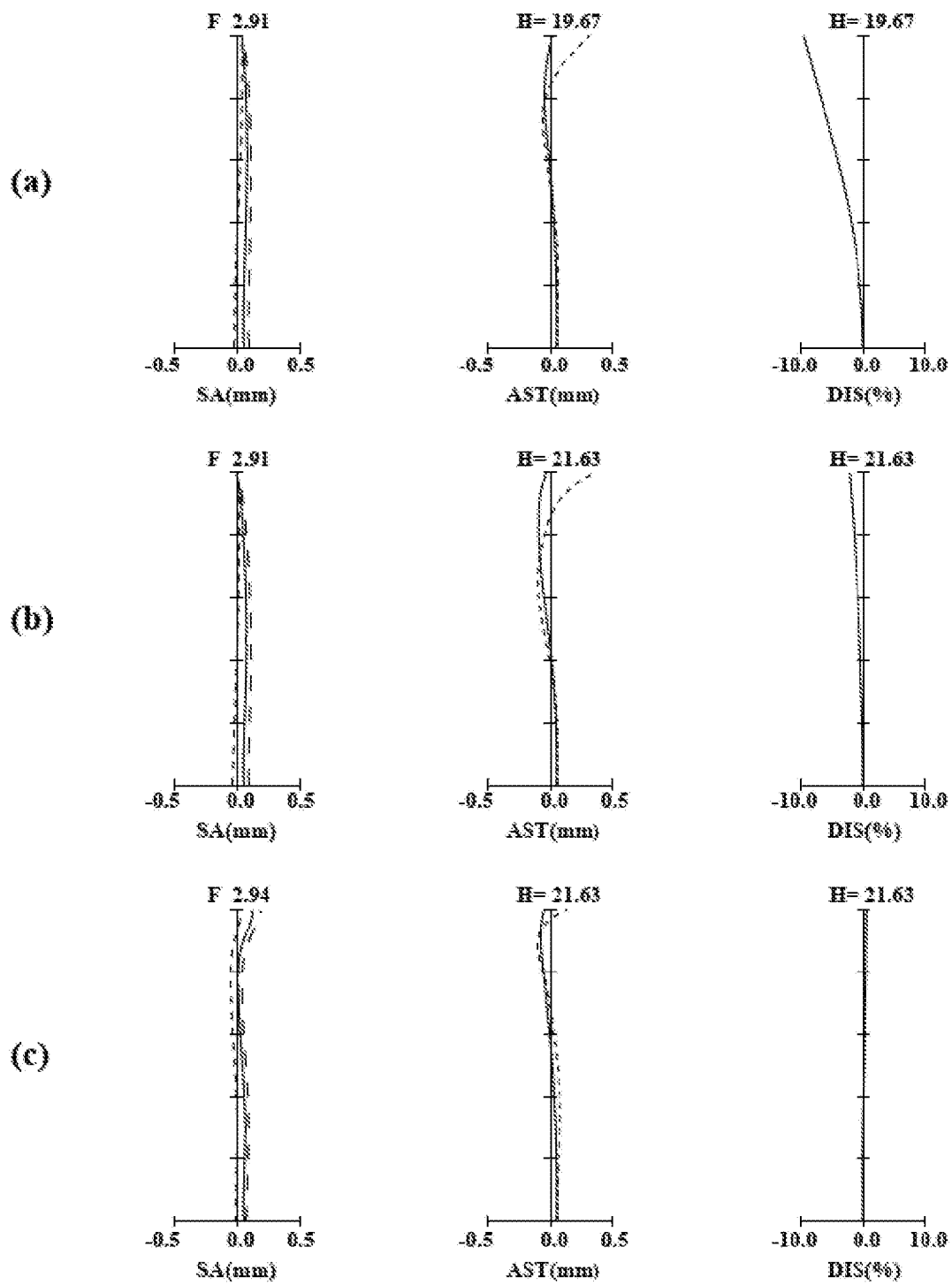
FIG. 3 illustrates longitudinal aberration diagrams showing what state the zoom lens system assumes at a shortest shooting range focus point in the first example of numerical values.
Figure 5:
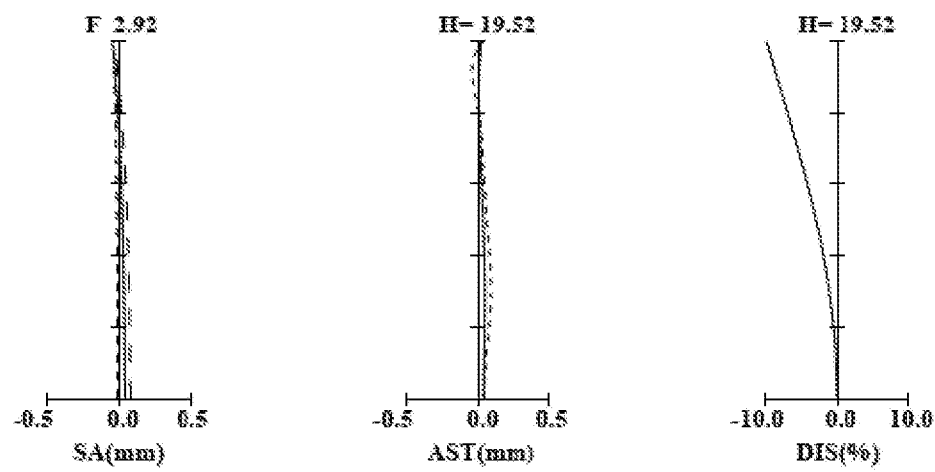
FIG. 5 illustrates longitudinal aberration diagrams showing what state the zoom lens system assumes at the infinity focus point in the second example of numerical values.
Figure 5:
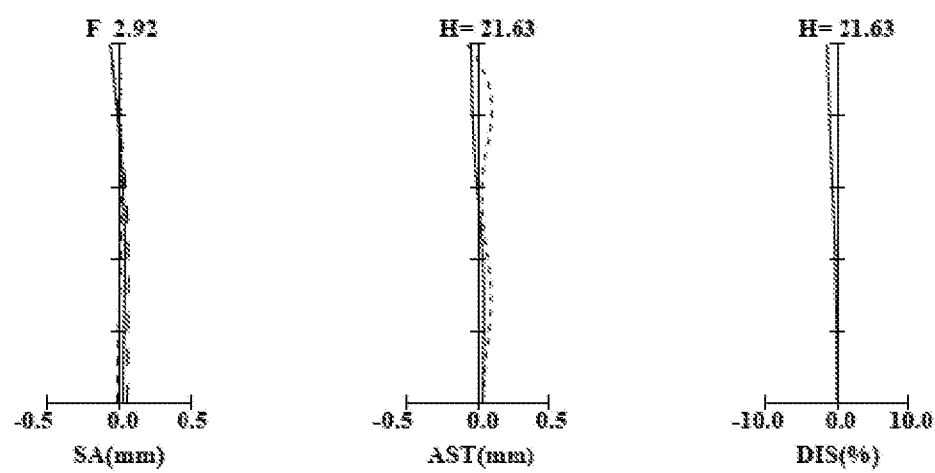
Figure 5:
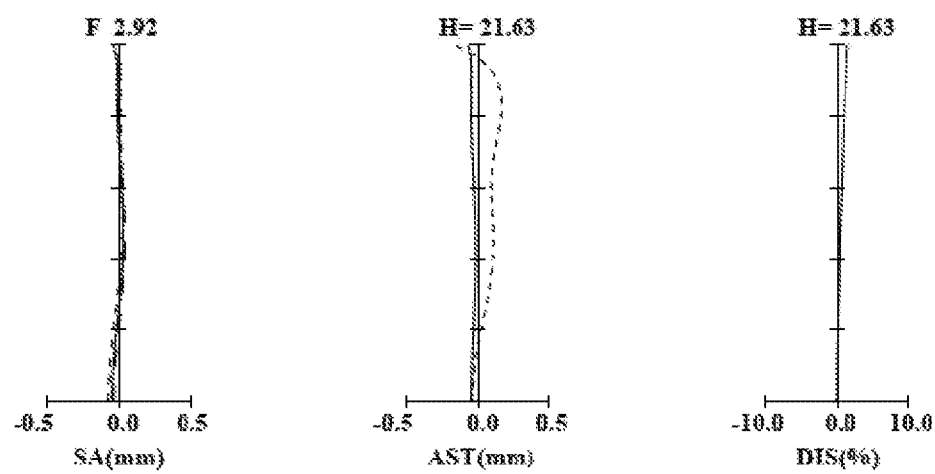
Figure 6:
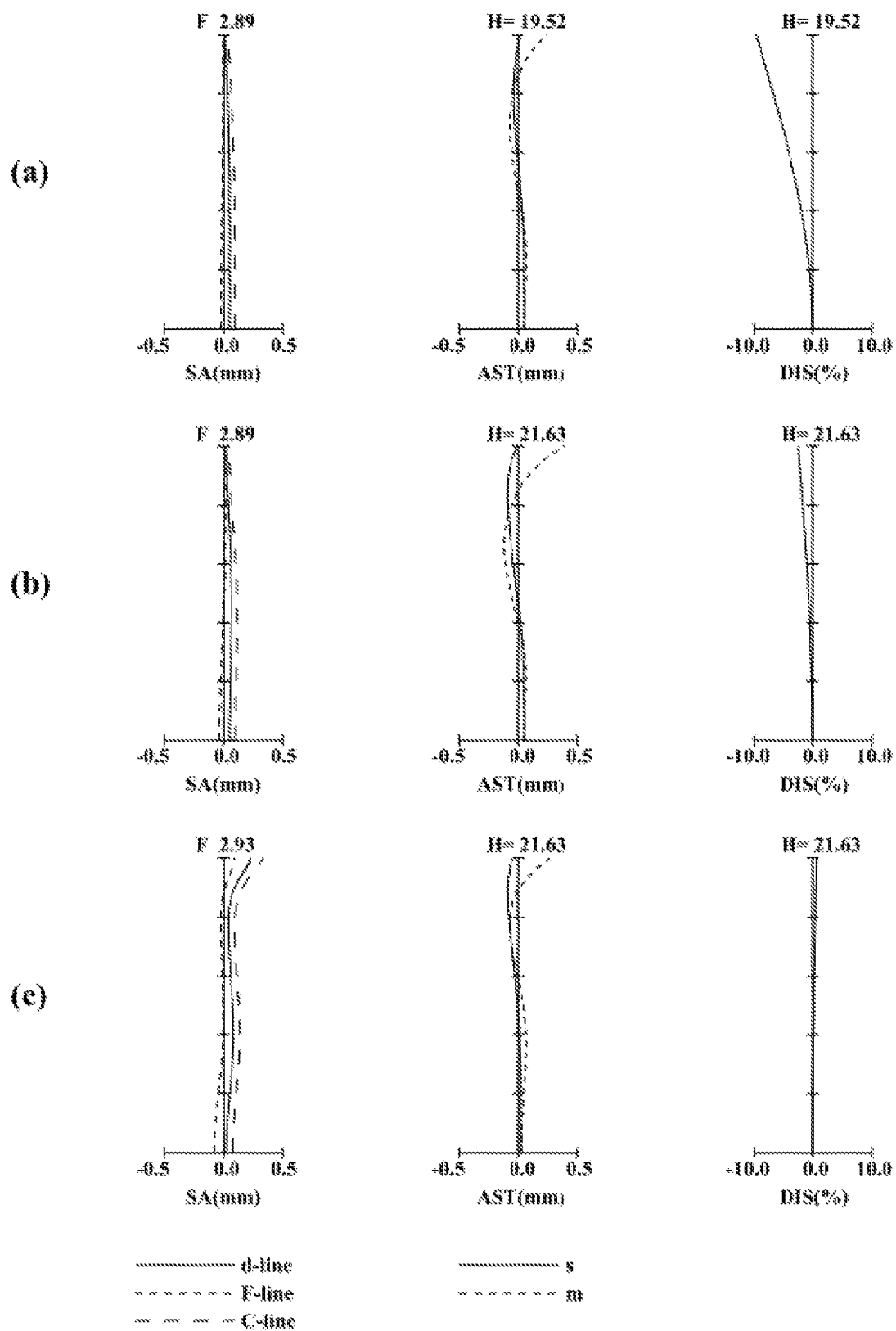
FIG. 6 illustrates longitudinal aberration diagrams showing what state the zoom lens system assumes at a shortest shooting range focus point in the second example of numerical values.
Figure 8:
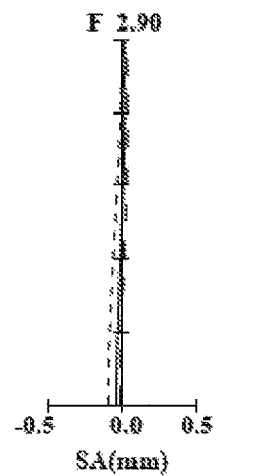
FIG. 8 illustrates longitudinal aberration diagrams showing what state the zoom lens system assumes at the infinity focus point in the third example of numerical values.
Figure 8:
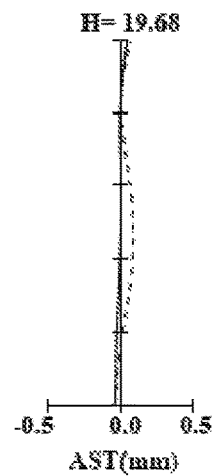
Figure 8:
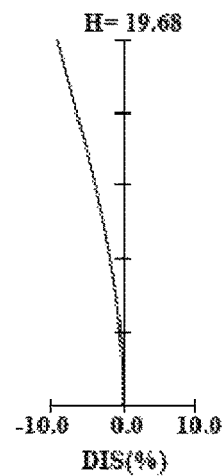
Figure 8:
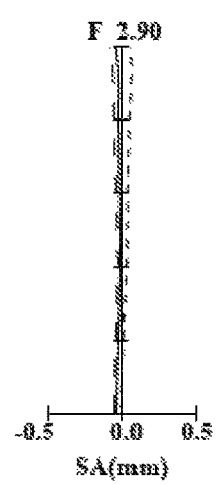
Figure 8:
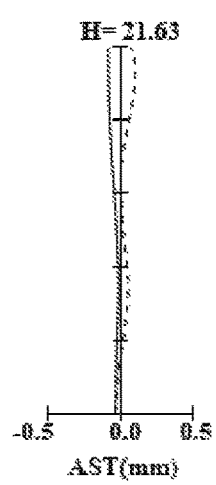
Figure 8:
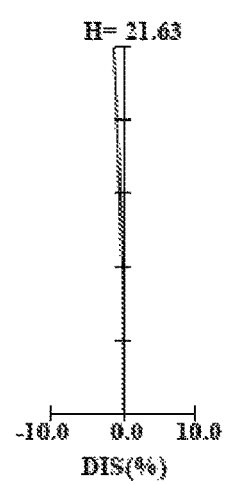
Figure 8:
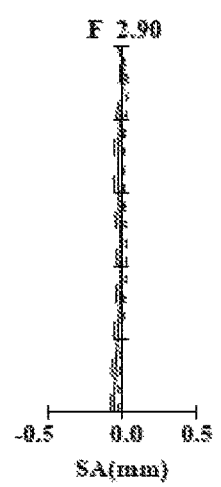
Figure 8:
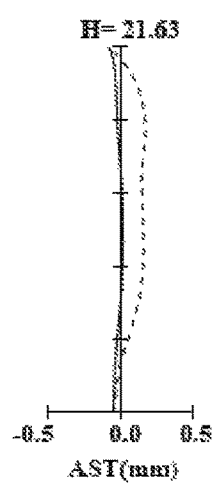
Figure 8:
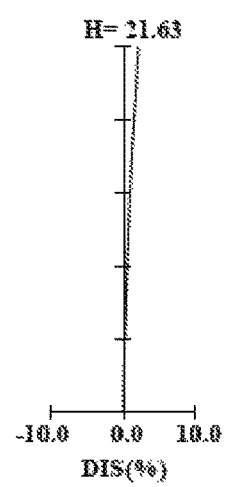
Figure 9:
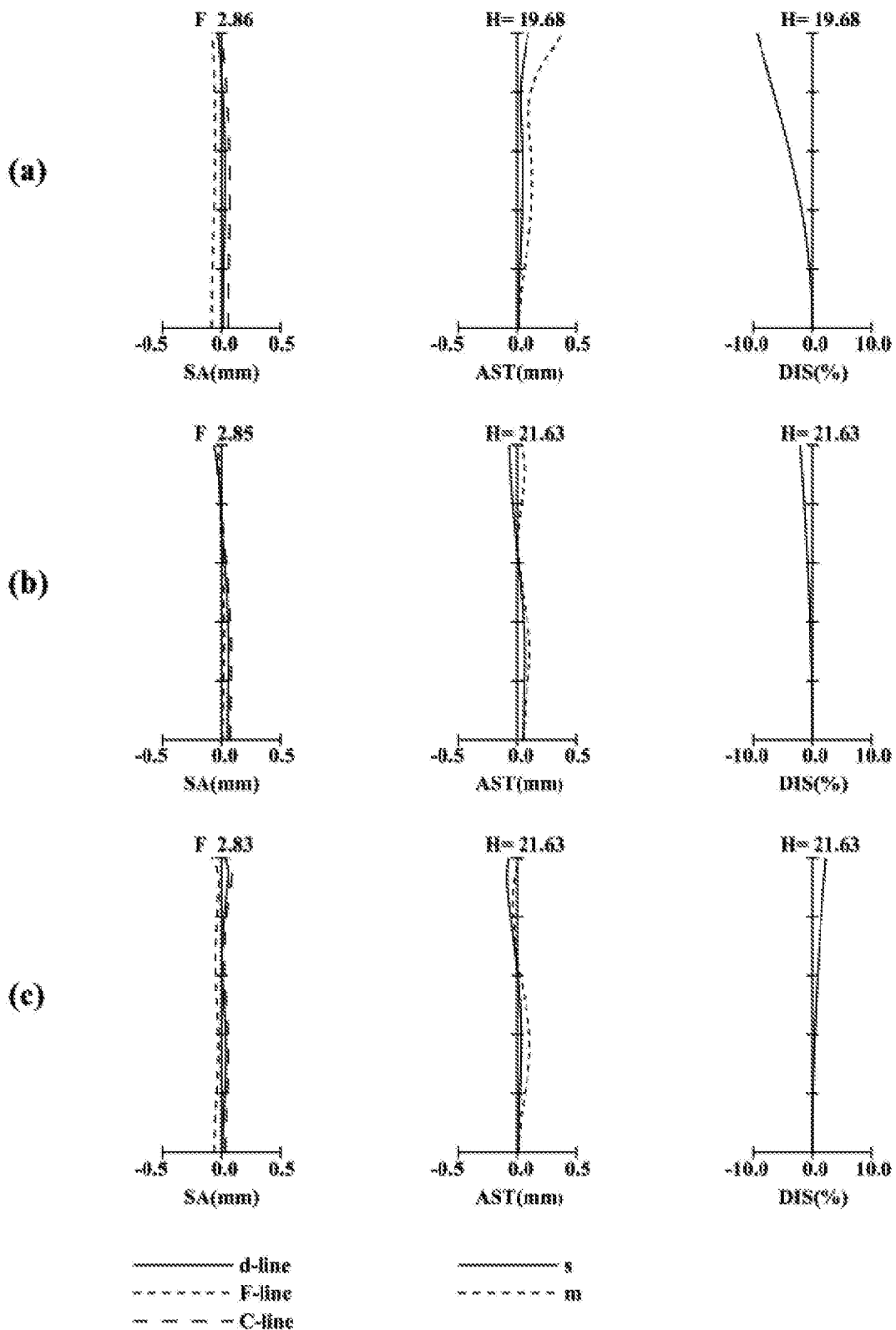
FIG. 9 illustrates longitudinal aberration diagrams showing what state the zoom lens system assumes at a shortest shooting range focus point in the third example of numerical values.

FIGS. 2, 5, and 8 are longitudinal aberration diagrams showing what state the zoom lens systems according to the first, second, and third examples of numerical values assume at the infinity focus point. FIGS. 3, 6, and 9 are longitudinal aberration diagrams showing what state the zoom lens systems according to the first, second, and third examples of numerical values assume at the shortest shooting range focus point.

In each longitudinal aberration diagram, portion (a) shows the respective aberrations at the wide-angle end, portion (b) shows the respective aberrations at the intermediate position, and portion (c) shows the respective aberrations at the telephoto end. Each of portions (a), (b) and (c) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

(First Example of Numerical Values)

A first exemplary set of numerical values for the zoom lens system corresponds to the first embodiment shown in FIG. 1. Specifically, as the first example of numerical values, surface data for the zoom lens system is shown in Table 1, aspheric surface data is shown in Table 2, various types of data at the infinity focus point are shown in Tables 3A-3C, and interval data defining the positions of the focus lens group at the shortest shooting range focus point is shown in Table 3E. d6, d14, . . . and d37 each indicate either the interval between two adjacent lens groups or the interval between a lens group located closest to the image and the image plane S. See the drawings representing the corresponding embodiment.

TABLE 1

(Surface data)

| Surface No. | r | d | nd | vd |
|---|---|---|---|---|
| object surface | ∞ | variable | | |
| 1. | 390.10470 | 1.80000 | 1.92286 | 20.9 |
| 2. | 158.53990 | 0.01000 | 1.56732 | 42.8 |
| 3. | 158.53990 | 3.56220 | 1.80420 | 46.5 |
| 4. | 380.94020 | 0.30000 | | |
| 5. | 69.95190 | 6.83900 | 1.77250 | 49.6 |
| 6. | 317.49200 | variable | | |
| 7. | 119.01910 | 1.50000 | 1.71300 | 53.9 |
| 8. | 18.59660 | 11.39220 | | |
| 9*. | −46.65000 | 1.50000 | 1.80998 | 40.9 |
| 10*. | 124.07780 | 1.06620 | | |
| 11. | 104.88360 | 7.96010 | 1.84666 | 23.8 |
| 12. | −61.06960 | 3.44200 | | |
| 13. | −24.33700 | 1.00000 | 1.48749 | 70.4 |
| 14. | −41.21780 | variable | | |
| 15 (aperture). | ∞ | 2.50000 | | |
| 16. | 46.20570 | 4.66220 | 1.92286 | 20.9 |
| 17. | 244.53190 | 3.72970 | | |
| 18. | 47.11310 | 5.55750 | 1.49700 | 81.6 |
| 19. | −86.51450 | 0.01000 | 1.56732 | 42.8 |
| 20. | −86.51450 | 1.00000 | 1.92119 | 24.0 |
| 21. | 68.78670 | 0.50000 | | |
| 22. | 36.55540 | 6.20420 | 1.49700 | 81.6 |
| 23. | −120.81460 | 0.36590 | | |
| 24. | −89.24450 | 1.00000 | 1.84666 | 23.8 |
| 25. | 211.27960 | variable | | |
| 26. | 28.45430 | 8.46010 | 1.55032 | 75.5 |
| 27. | −64.46030 | 0.50000 | | |
| 28*. | 344.01620 | 1.80000 | 1.80998 | 40.9 |
| 29*. | 2000.00000 | variable | | |
| 30. | 94.14430 | 1.00000 | 1.83481 | 42.7 |
| 31. | 29.50680 | variable | | |
| 32*. | 44.24170 | 1.50000 | 1.68948 | 31.0 |
| 33*. | 28.43610 | variable | | |
| 34. | 55.42250 | 5.69530 | 1.84666 | 23.8 |
| 35. | −82.68570 | 1.30970 | | |
| 36. | −160.47040 | .20000 | 1.95375 | 32.3 |
| 37. | 168.04320 | variable | | |
| 38. | ∞ | 2.10000 | 1.51680 | 64.2 |
| 39. | ∞ | BF | | |
| Image plane | ∞ | | | |

TABLE 2

(Aspheric surface data)

Ninth surface:

K = 2.77311E−01, A4 = 5.79744E−06, A6 = −6.69046E−08,
A8 = 5.10351E−10, A10 = −1.99835E−12, A12 = 3.11855E−15

Tenth surface:

K = −1.00000E+00, A4 = −2.30482E−06, A6 = −7.10387E−08,
A8 = 5.08729E−10, A10 = −2.06473E−12, A12 = 3.14110E−15

Twenty-eighth surface:

K = 1.00000E+00, A4 = −6.70134E−06, A6 = 1.60358E−07,
A8 = −2.23219E−10, A10 = −1.78175E−12, A12 = 3.19782E−15

Twenty-ninth surface:

K = 1.00000E+00, A4 = 1.30709E−05, A6 = 1.88360E−07,
A8 = −2.30320E−10, A10 = −1.13940E−12, A12 = 1.07849E−16

Thirty-second surface:

K = −1.00000E+00, A4 = −6.49741E−05, A6 = 3.26474E−07,
A8 = −1.14181E−09, A10 = 2.42790E−12, A12 = −2.35868E−15

Thirty-third surface:

K = 9.97939E−01, A4 = −7.70073E−05, A6 = 3.23600E−07,
A8 = −1.22916E−09, A10 = 2.63417E−12, A12 = −2.84998E−15

(Various Types of Data at Infinity Focus Point)

TABLE 3A (Various types of data)
Zoom ratio: 2.32654

| | Wide | Middle | Tele |
|---|---|---|---|
| Focal length | 24.8400 | 40.8776 | 67.5503 |
| F number | 2.92728 | 2.92703 | 2.92709 |
| Angle of View | 41.0488 | 27.9617 | 17.4216 |
| Image height | 19.6710 | 21.6300 | 21.6300 |
| Total lens length | 157.4997 | 164.5424 | 181.8628 |
| BF | 1.00000 | 1.00000 | 1.00000 |
| d0 | ∞ | ∞ | ∞ |
| d6 | 1.0000 | 13.4445 | 27.5307 |
| d14 | 25.9929 | 10.8551 | 0.6543 |
| d25 | 3.5926 | 1.5593 | 1.0000 |
| d29 | 2.9770 | 3.6205 | 4.8909 |
| d31 | 11.0043 | 12.9949 | 16.4729 |
| d33 | 3.5504 | 2.6123 | 2.6369 |
| d37 | 18.9162 | 28.9895 | 38.2108 |

TABLE 3B (Data about single lens)

| Lens | Start surface | Focal Length |
|---|---|---|
| 1. | 1 | −290.4923 |
| 2. | 3 | 335.2798 |
| 3. | 5 | 114.7599 |
| 4. | 7 | −31.1056 |
| 5. | 9 | −41.6930 |
| 6. | 11 | 46.6115 |
| 7. | 13 | −124.3105 |
| 8. | 16 | 61.0440 |
| 9. | 18 | 62.2327 |
| 10. | 20 | −41.4697 |
| 11. | 22 | 57.2159 |
| 12. | 24 | −73.9923 |
| 13. | 26 | 37.0687 |
| 14. | 28 | 512.7053 |
| 15. | 30 | −51.8458 |
| 16. | 32 | −120.0947 |
| 17. | 34 | 39.9462 |
| 18. | 36 | −85.9123 |

TABLE 3C (Data about zoom lens group)

| Group | Start surface | Focal Length | Lens configuration length | Front principal point | Rear principal point |
|---|---|---|---|---|---|
| 1. | 1 | 122.21006 | 12.51120 | 1.43685 | 6.91432 |
| 2. | 7 | −22.88112 | 27.86050 | 2.75545 | 8.40094 |
| 3. | 15 | 63.76189 | 25.52950 | −5.64859 | 4.32966 |
| 4. | 26 | 34.83583 | 10.76010 | 2.01274 | 5.60715 |
| 5. | 30 | −51.84577 | 1.00000 | 0.79944 | 1.25056 |
| 6. | 32 | −120.09470 | 1.50000 | 2.58532 | 3.16170 |
| 7. | 34 | 69.39062 | 8.20500 | −1.55834 | 1.82676 |

TABLE 3D (Zoom powers of zoom lens group)

| Group | Start Surface | Wide | Middle | Tele |
|---|---|---|---|---|
| 1. | 1 | 0.00000 | 0.00000 | 0.00000 |
| 2. | 7 | −0.25430 | −0.29512 | −0.36064 |
| 3. | 15 | −13.44682 | 6.73868 | 3.51041 |
| 4. | 26 | 0.03749 | −0.09790 | −0.23310 |

TABLE 3D-continued (Zoom powers of zoom lens group)

| Group | Start Surface | Wide | Middle | Tele |
|---|---|---|---|---|
| 5. | 30 | 1.90292 | 2.23738 | 2.62737 |
| 6. | 32 | 1.38644 | 1.68503 | 2.20235 |
| 7. | 34 | 0.60094 | 0.45572 | 0.32370 |

TABLE 3E (Data about interval defining position of focus lens group at shortest shooting range focus point)

| | Wide | Middle | Tele |
|---|---|---|---|
| d29 | 5.1768 | 7.2082 | 11.7536 |
| d31 | 4.8064 | 5.3038 | 4.8064 |
| d33 | 7.5486 | 6.7157 | 7.4408 |

(Second Example of Numerical Values)

A second exemplary set of numerical values for the zoom lens system corresponds to the second embodiment shown in FIG. 4. Specifically, as the second example of numerical values, surface data for the zoom lens system is shown in Table 4, aspheric surface data is shown in Table 5, various types of data at the infinity focus point are shown in Tables 6A-6D, and interval data defining the positions of the focus lens group at the shortest shooting range focus point is shown in Table 6E:

TABLE 4

(Surface data)

| Surface No. | r | d | nd | vd |
|---|---|---|---|---|
| object surface | ∞ | variable | | |
| 1. | 2000.00000 | 1.70000 | 1.92286 | 20.9 |
| 2. | 214.42310 | 0.01000 | 1.56732 | 42.8 |
| 3. | 214.42310 | 3.33210 | 1.80420 | 46.5 |
| 4. | 862.85120 | 0.50000 | | |
| 5. | 71.03590 | 6.09100 | 1.80420 | 46.5 |
| 6. | 309.76130 | variable | | |
| 7. | 98.98670 | 1.50000 | 1.77250 | 49.6 |
| 8. | 19.34800 | 12.22280 | | |
| 9*. | −46.49710 | 1.50000 | 1.77200 | 50.0 |
| 10*. | 106.63960 | 0.77040 | | |
| 11. | 115.38450 | 6.01010 | 1.92119 | 24.0 |
| 12. | −71.69240 | 4.08330 | | |
| 13. | −24.05040 | 1.20000 | 1.49700 | 81.6 |
| 14. | −34.95670 | variable | | |
| 15 (aperture). | ∞ | 1.50000 | | |
| 16. | 47.61290 | 5.00210 | 1.92286 | 20.9 |
| 17. | −465.22990 | 1.32160 | | |
| 18. | 47.99700 | 5.62850 | 1.49700 | 81.6 |
| 19. | −90.01320 | 0.01000 | 1.56732 | 42.8 |
| 20. | −90.01320 | 1.20000 | 1.92286 | 20.9 |
| 21. | 51.74150 | 1.28670 | | |
| 22. | 46.60430 | 5.91040 | 1.49700 | 81.6 |
| 23. | −73.08890 | 0.88030 | | |
| 24. | −48.74690 | 1.20000 | 2.00069 | 25.5 |
| 25. | −183.55060 | variable | | |
| 26. | 28.21400 | 9.42520 | 1.49700 | 81.6 |
| 27. | −55.79090 | 0.50000 | | |
| 28*. | 148.81120 | 2.39540 | 1.80998 | 40.9 |
| 29*. | 500.00000 | variable | | |
| 30. | 80.93640 | 1.00000 | 1.71999 | 50.2 |
| 31. | 28.75550 | variable | | |
| 32*. | 66.88770 | 1.50000 | 1.68948 | 31.0 |
| 33*. | 29.39950 | variable | | |
| 34. | 56.56010 | 3.48210 | 1.92286 | 20.9 |
| 35. | 2000.00000 | variable | | |
| 36. | ∞ | 2.10000 | 1.51680 | 64.2 |
| 37. | ∞ | BF | | |
| Image Plane | ∞ | | | |

TABLE 5

(Aspheric surface data)

Ninth surface:

K = −2.33733E−01, A4 = −2.66671E−06, A6 = 1.96406E−08, A8 = −8.53231E−11, A10 = 2.50664E−13, A12 = −2.99699E−16
Tenth surface:

K = −8.56855E−01, A4 = −9.02267E−06, A6 = 1.56055E−08, A8 = −8.51130E−11, A10 = 2.10164E−13, A12 = −3.49670E−16
Twenty-eighth surface:

K = −5.10275E−01, A4 = 6.75913E−06, A6 = 5.35898E−08, A8 = 1.62742E−10, A10 = −2.04924E−12, A12 = 2.18223E−15
Twenty-ninth surface:

K = 1.00000E+00, A4 = 2.50729E−05, A6 = 7.02836E−08, A8 = 2.78051E−10, A10 = −2.03451E−12, A12 = 1.31782E−16
Thirty-second surface:

K = −3.08091E−01, A4 = −6.34840E−05, A6 = 3.95886E−07, A8 = −1.64875E−09, A10 = 4.16609E−12, A12 = −5.05923E−15
Thirty-third surface:

K = 2.96947E−01, A4 = −7.14410E−05, A6 = 4.01897E−07, A8 = −1.70296E−09, A10 = 4.15748E−12, A12 = −4.65109E−15

(Various Types of Data at Infinity Focus Point)

TABLE 6A (Various types of data)
Zoom ratio: 2.34343

| | Wide | Middle | Tele |
|---|---|---|---|
| Focal length | 24.7679 | 40.5351 | 67.7598 |
| F number | 2.91811 | 2.91800 | 2.91815 |
| Angle of view | 41.1310 | 28.4301 | 17.4567 |
| Image height | 19.5210 | 21.6300 | 21.6300 |
| Total lens length | 156.0002 | 161.4997 | 179.9995 |
| BF | 1.00000 | 1.00000 | 1.00000 |
| d0 | ∞ | ∞ | ∞ |
| d6 | 1.5000 | 12.7948 | 27.4909 |
| d14 | 27.1535 | 11.7527 | 1.5000 |
| d25 | 5.6683 | 2.2966 | 1.0000 |
| d29 | 2.0000 | 2.3960 | 3.1768 |
| d31 | 11.6644 | 13.2472 | 15.8957 |
| d33 | 2.3281 | 2.3281 | 2.3281 |
| d35 | 21.4239 | 32.4223 | 44.3460 |

TABLE 6B (Data about single lens)

| Lens | Start surface | Focal Length |
|---|---|---|
| 1. | 1 | −260.3668 |
| 2. | 3 | 353.9884 |
| 3. | 5 | 113.3267 |

TABLE 6B-continued (Data about single lens)

| Lens | Start surface | Focal Length |
|---|---|---|
| 4. | 7 | −31.3885 |
| 5. | 9 | −41.7638 |
| 6. | 11 | 48.7521 |
| 7. | 13 | −160.9840 |
| 8. | 16 | 47.0230 |
| 9. | 18 | 63.8522 |
| 10. | 20 | −35.4577 |
| 11. | 22 | 58.2147 |
| 12. | 24 | −66.6251 |
| 13. | 26 | 39.1612 |
| 14. | 28 | 260.7760 |
| 15. | 30 | −62.4485 |
| 16. | 32 | −77.3429 |
| 17. | 34 | 63.0173 |

TABLE 6C (Data about zoom lens group)

| Group | Start surface | Focal Length | Lens configuration length | Front principal point | Rear principal point |
|---|---|---|---|---|---|
| 1. | 1 | 128.30367 | 11.63310 | 2.15064 | 7.20736 |
| 2. | 7 | −23.32330 | 27.28660 | 2.86853 | 7.85711 |
| 3. | 15 | 63.41362 | 23.93960 | −8.26949 | 2.27399 |
| 4. | 26 | 34.54148 | 12.32060 | 2.76389 | 6.66333 |
| 5. | 30 | −62.44847 | 1.00000 | 0.90908 | 1.32298 |
| 6. | 32 | −77.34285 | 1.50000 | 1.61042 | 2.20784 |
| 7. | 34 | 63.01732 | 3.48210 | −0.05266 | 1.62010 |

TABLE 6D (Zoom powers of zoom lens group)

| Group | Start Surface | Wide | Middle | Tele |
|---|---|---|---|---|
| 1. | 1 | 0.00000 | 0.00000 | 0.00000 |
| 2. | 7 | −0.24248 | −0.27474 | −0.33226 |
| 3. | 15 | −16.34950 | 5.88814 | 3.22210 |
| 4. | 26 | 0.03127 | −0.11432 | −0.26208 |
| 5. | 30 | 1.66292 | 1.89693 | 2.18369 |
| 6. | 32 | 1.58178 | 2.15648 | 3.75338 |
| 7. | 34 | 0.59201 | 0.41762 | 0.22965 |

TABLE 6E (Data about interval defining position of focus lens group at shortest shooting range focus point)

| | Wide | Middle | Tele |
|---|---|---|---|
| d29 | 4.7079 | 6.3304 | 10.3858 |
| d31 | 5.9602 | 6.6438 | 5.9645 |
| d33 | 5.3244 | 4.9971 | 5.0503 |

(Third Example of Numerical Values)

A third exemplary set of numerical values for the zoom lens system corresponds to the third embodiment shown in FIG. 7. Specifically, as the third example of numerical values, surface data for the zoom lens system is shown in Table 7, aspheric surface data is shown in Table 8, various types of data at the infinity focus point are shown in Tables 9A-9D, and interval data defining the positions of the focus lens group at the shortest shooting range focus point is shown in Table 9E:

TABLE 7

(Surface data)

| Surface No. | r | d | nd | vd |
|---|---|---|---|---|
| object surface | ∞ | variable | | |
| 1. | 255.30620 | 1.80000 | 1.92286 | 20.9 |
| 2. | 134.56470 | 0.01000 | 1.56732 | 42.8 |
| 3. | 134.56470 | 3.71250 | 1.80420 | 46.5 |
| 4. | 252.81370 | 0.30000 | | |
| 5. | 69.40380 | 7.09830 | 1.80420 | 46.5 |
| 6. | 199.44020 | variable | | |
| 7. | 105.66850 | 1.50000 | 1.77250 | 49.6 |
| 8. | 19.53780 | 11.12380 | | |
| 9*. | −69.99600 | 1.50000 | 1.80998 | 40.9 |
| 10*. | 105.63160 | 1.14880 | | |
| 11. | 104.43090 | 8.00000 | 1.84666 | 23.8 |
| 12. | −71.85910 | 2.95160 | | |
| 13. | −29.81540 | 1.00000 | 1.48749 | 70.4 |
| 14. | −74.49560 | variable | | |
| 15 (aperture). | ∞ | 2.50000 | | |
| 16. | 43.48460 | 5.06100 | 1.92286 | 20.9 |
| 17. | 621.73000 | 1.80600 | | |
| 18. | 32.10060 | 5.26120 | 1.49700 | 81.6 |
| 19. | 611.40940 | 0.01000 | 1.56732 | 42.8 |
| 20. | 611.40940 | 1.00000 | 1.92119 | 24.0 |
| 21. | 31.21760 | 1.23470 | | |
| 22. | 29.51130 | 6.29980 | 1.49700 | 81.6 |
| 23. | −202.60030 | 1.45050 | | |
| 24. | −53.66250 | 1.38690 | 1.84666 | 23.8 |
| 25. | 286.32700 | variable | | |
| 26. | 28.67500 | 8.03610 | 1.55032 | 75.5 |
| 27. | −49.03590 | 0.50000 | | |
| 28*. | 975.83860 | 1.80000 | 1.80998 | 40.9 |
| 29*. | 2000.00000 | variable | | |
| 30. | 48.69210 | 1.00000 | 1.80610 | 40.7 |
| 31. | 31.79440 | variable | | |
| 32*. | 86.61890 | 1.50000 | 1.68948 | 31.0 |
| 33*. | 31.43310 | variable | | |
| 34. | 56.68380 | 7.16530 | 1.80809 | 22.8 |
| 35. | −57.42810 | variable | | |
| 36. | −66.39450 | 1.10000 | 2.00100 | 29.1 |
| 37. | 407.81220 | variable | | |
| 38. | ∞ | 2.10000 | 1.51680 | 64.2 |
| 39. | ∞ | BF | | |
| Image Plane | ∞ | | | |

TABLE 8

(Aspheric surface data)

Ninth surface:

K = 1.00000E+00, A4 = 5.04302E−06, A6 = −6.77940E−08,
A8 = 4.50604E−10, A10 = −1.57659E−12, A12 = 2.12350E−15

Tenth surface:

K = −1.00000E+00, A4 = −1.25658E−06, A6 = −7.32190E−08,
A8 = 4.69479E−10, A10 = −1.71273E−12, A12 = 2.35825E−15

Twenty-eighth surface:

K = 1.00000E+00, A4 = −9.10543E−06, A6 = 1.31783E−07,
A8 = −2.50735E−10, A10 = −1.20541E−12, A12 = 2.34014E−15

Twenty-ninth surface:

K = 1.00000E+00, A4 = 1.02879E−05, A6 = 1.52998E−07,
A8 = −1.87035E−10, A10 = −1.11987E−12, A12 = 1.12628E−15

Thirty-second surface:

K = −5.18313E−01, A4 = −5.30524E−05, A6 = 3.35118E−07,
A8 = −1.28447E−09, A10 = 2.56669E−12, A12 = −2.05168E−15

Thirty-third surface:

K = 2.47755E−01, A4 = −5.72906E−05, A6 = 3.31891E−07,
A8 = −1.31509E−09, A10 = 2.74655E−12, A12 = −2.36586E−15

(Various Types of Data at Infinity Focus Point)

TABLE 9A (Various types of data)
Zoom ratio: 2.19998

|  | Wide | Middle | Tele |
|---|---|---|---|
| Focal length | 24.8400 | 40.8509 | 67.5499 |
| F number | 2.90026 | 2.90016 | 2.90020 |
| Angle of view | 41.4639 | 28.5442 | 17.6325 |
| Image height | 19.6840 | 21.6300 | 21.6300 |
| Total lens length | 160.9997 | 163.2228 | 181.5391 |
| BF | 1.00000 | 1.00000 | 1.00000 |
| d0 | ∞ | ∞ | ∞ |
| d6 | 1.0000 | 13.2228 | 33.6409 |
| d14 | 29.7469 | 11.3928 | 0.5000 |
| d25 | 4.6704 | 2.3200 | 1.0000 |
| d29 | 2.0000 | 3.2451 | 3.9423 |
| d31 | 5.5973 | 13.2210 | 19.2446 |
| d33 | 6.3695 | 4.9849 | 3.1365 |
| d35 | 1.0000 | 4.2206 | 9.4592 |
| d37 | 21.2591 | 21.2591 | 21.2591 |

TABLE 9B (Data about single lens)

| Lens | Start surface | Focal Length |
|---|---|---|
| 1. | 1 | −310.5408 |
| 2. | 3 | 352.8059 |
| 3. | 5 | 129.2193 |
| 4. | 7 | −31.2661 |
| 5. | 9 | −51.7778 |
| 6. | 11 | 51.3456 |
| 7. | 13 | −102.7278 |
| 8. | 16 | 50.4509 |
| 9. | 18 | 67.9632 |
| 10. | 20 | −35.7413 |
| 11. | 22 | 52.3008 |
| 12. | 24 | −53.2777 |
| 13. | 26 | 34.1319 |
| 14. | 28 | 2350.8471 |
| 15. | 30 | −116.7388 |
| 16. | 32 | −72.3594 |
| 17. | 34 | 36.3208 |
| 18. | 36 | −56.9752 |

TABLE 9C (Data about zoom lens group)

| Group | Start surface | Focal Length | Lens configuration length | Front principal point | Rear principal point |
|---|---|---|---|---|---|
| 1. | 1 | 137.98984 | 12.92080 | −0.11250 | 5.68478 |
| 2. | 7 | −22.87844 | 27.22420 | 3.21395 | 9.52016 |
| 3. | 15 | 68.88220 | 26.01010 | −15.77337 | −1.27175 |
| 4. | 26 | 33.68504 | 10.33610 | 2.02783 | 5.48555 |
| 5. | 30 | −116.73883 | 1.00000 | 1.63875 | 2.07005 |
| 6. | 32 | −72.35944 | 1.50000 | 1.40918 | 2.01138 |
| 7. | 34 | 36.32083 | 7.16530 | 2.02537 | 5.11334 |
| 8. | 36 | −56.97516 | 1.10000 | 0.07688 | 0.62779 |

TABLE 9D (Zoom powers of zoom lens group)

| Group | Start Surface | Wide | Middle | Tele |
|---|---|---|---|---|
| 1. | 1 | 0.00000 | 0.00000 | 0.00000 |
| 2. | 7 | −0.22070 | −0.25021 | −0.32214 |

TABLE 9D-continued (Zoom powers of zoom lens group)

| Group | Start Surface | Wide | Middle | Tele |
|---|---|---|---|---|
| 3. | 15 | 7.42518 | 2.55536 | 1.90266 |
| 4. | 26 | −0.07606 | −0.32056 | −0.57286 |
| 5. | 30 | 1.31195 | 1.42382 | 1.57354 |
| 6. | 32 | 1.72782 | 1.98551 | 2.89566 |
| 7. | 34 | 0.44784 | 0.35914 | 0.21512 |
| 8. | 36 | 1.42263 | 1.42267 | 1.42240 |

TABLE 9E (Data about interval defining position of focus lens group at shortest shooting range focus point)

|  | Wide | Middle | Tele |
|---|---|---|---|
| d29 | 3.5806 | 7.2450 | 15.1401 |
| d31 | 4.0167 | 9.2211 | 8.0468 |
| d35 | 1.8571 | 5.9377 | 12.8185 |
| d37 | 20.4020 | 19.5421 | 17.8998 |

TABLE 10

(Values corresponding to conditions)

|  | 1st example of numerical values | 2nd example of numerical values | 3rd example of numerical values |
|---|---|---|---|
| (1) vd_pG3G4 | 81.6 | 81.6 | 81.6 |
| (2) vd_pG3 | 81.6 | 81.6 | 81.6 |
| (3) Nd_G31 | 1.92286 | 1.92286 | 1.92286 |
| (4) TH_L1L2/TH_G1 | 0.429 | 0.433 | 0.427 |
| (5) f_GR/f_GF | 2.316 | 1.239 | 0.488 |
| (6) THair_G3G4¥fT | 0.053 | 0.084 | 0.069 |
| (7) TH_FB/L_W | 0.14 | 0.157 | 0.15 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for digital still camera systems, digital camcorder systems, and other camera systems that require high image quality.

The invention claimed is:

1. A zoom lens system comprising, as a plurality of lens groups:
   a first lens group having positive power;
   a second lens group having negative power;
   a third lens group having positive power;
   a fourth lens group having positive power;
   a fifth lens group having negative power; and
   a following lens group,
   the first, second, third, fourth, and fifth lens groups and the following lens group being arranged in this order such that the first lens group is located closer to an object than any other lens group and that the following lens group is located closer to an image than any other lens group, wherein
   while the zoom lens system is zooming, intervals between the plurality of lens groups change,
   while the zoom lens system is focusing from an infinity focus point through a shortest shooting range, the fifth lens group and a negative lens group included in the following lens group move,
   the zoom lens system satisfies the following Inequality (1):

$$vd\_pG3G4 > 75 \qquad (1)$$

where vd_pG3G4 is a maximum value of abbe numbers of one or more positive lenses included in the third lens group and the fourth lens group, and
   the third lens group includes:
   a first lens having positive power;
   a second lens having positive power;
   a third lens having negative power;
   a fourth lens having positive power; and
   a fifth lens having negative power, the first, second, third, fourth, and fifth lenses being arranged in this order such that the first lens is located closer to the object than any other lens of the third lens group is.

2. A zoom lens system comprising, as a plurality of lens groups:
   a first lens group having positive power;
   a second lens group having negative power;
   a third lens group having positive power;
   a fourth lens group having positive power;
   a fifth lens group having negative power; and
   a following lens group,
   the first, second, third, fourth, and fifth lens groups and the following lens group being arranged in this order such that the first lens group is located closer to an object than any other lens group and that the following lens group is located closer to an image than any other lens group, wherein
   while the zoom lens system is zooming, intervals between the plurality of lens groups change,
   while the zoom lens system is focusing from an infinity focus point through a shortest shooting range, the fifth lens group and a negative lens group included in the following lens group move,
   the zoom lens system satisfies the following Inequality (1):

$$vd\_pG3G4 > 75 \qquad (1)$$

where vd_pG3G4 is a maximum value of abbe numbers of one or more positive lenses included in the third lens group and the fourth lens group, and
   while the zoom lens system is focusing from an infinity focus point through a shortest shooting range:
   (a) the fifth lens group having negative power moves toward the image, and
   the following lens group includes a sixth lens group having negative power, the sixth lens group being adjacent to the fifth lens group and located closer to the image than the fifth lens group, the sixth lens group moving toward the object, or
   (b) the fifth lens group having negative power moves toward the image, and
   a lens group having negative power and located closer to the image than any other lens group in the zoom lens system moves toward the image.

3. A zoom lens system comprising, as a plurality of lens groups:
   a first lens group having positive power;
   a second lens group having negative power;
   a third lens group having positive power;
   a fourth lens group having positive power;
   a fifth lens group having negative power; and
   a following lens group,
   the first, second, third, fourth, and fifth lens groups and the following lens group being arranged in this order such that the first lens group is located closer to an object than any other lens group and that the following lens group is located closer to an image than any other lens group, wherein
   while the zoom lens system is zooming, intervals between the plurality of lens groups change,
   while the zoom lens system is focusing from an infinity focus point through a shortest shooting range, the fifth lens group and a negative lens group included in the following lens group move,
   the zoom lens system satisfies the following Inequality (1):

$$vd\_pG3G4 > 75 \qquad (1)$$

where vd_pG3G4 is a maximum value of abbe numbers of one or more positive lenses included in the third lens group and the fourth lens group, and
   the zoom lens system satisfies the following Inequality (4):

$$0.3 < TH\_L1L2/TH\_G1 < 0.55 \qquad (4)$$

where TH_L1L2 is an interval, measured along an optical axis, between a surface, facing the object, of a first lens located closer to the object than any other lens in the first lens group and a surface, facing the image, of a second lens adjacent to the first lens and located closer to the image than the first lens is, and TH_G1 is a thickness of the first lens group.

4. A zoom lens system comprising, as a plurality of lens groups:
   a first lens group having positive power;
   a second lens group having negative power;
   a third lens group having positive power;
   a fourth lens group having positive power;
   a fifth lens group having negative power; and
   a following lens group,
   the first, second, third, fourth, and fifth lens groups and the following lens group being arranged in this order such that the first lens group is located closer to an object than any other lens group and that the following lens group is located closer to an image than any other lens group, wherein
   while the zoom lens system is zooming, intervals between the plurality of lens groups change, while the zoom lens system is focusing from an infinity focus point through a shortest shooting range, the fifth lens group and a negative lens group included in the following lens group move, the zoom lens system satisfies the following Inequality (1):

$$vd\_pG3G4 > 75 \tag{1}$$

where vd_pG3G4 is a maximum value of abbe numbers of one or more positive lenses included in the third lens group and the fourth lens group, and the zoom lens system satisfies the following Inequality (2):

$$vd\_pG3 75 \tag{2}$$

where vd_pG3 is an abbe number of each of at least two positive lenses included in the third lens group, and the zoom lens system satisfies the following Inequality (3):

$$Nd\ G31 > 1.85 \tag{3}$$

where Nd G31 is a refractive index of the first lens of the third lens group, the first lens being located closer to the object than any other lens of the third lens group is.

5. A zoom lens system comprising, as a plurality of lens groups:
a first lens group having positive power;
a second lens group having negative power;
a third lens group having positive power;
a fourth lens group having positive power;
a fifth lens group having negative power; and
a following lens group,
the first, second, third, fourth, and fifth lens groups and the following lens group being arranged in this order such that the first lens group is located closer to an object than any other lens group and that the following lens group is located closer to an image than any other lens group, wherein
while the zoom lens system is zooming, intervals between the plurality of lens groups change,
while the zoom lens system is focusing from an infinity focus point through a shortest shooting range, the fifth lens group and a negative lens group included in the following lens group move,
the zoom lens system satisfies the following Inequality (1):

$$vd\_pG3G4 > 75 \tag{1}$$

where vd_pG3G4 is a maximum value of abbe numbers of one or more positive lenses included in the third lens group and the fourth lens group, and
the zoom lens system satisfies the following Inequality (2):

$$vd\_pG3 > 75 \tag{2}$$

where vd_pG3 is an abbe number of each of at least two positive lenses included in the third lens group, and
the third lens group includes:
a first lens having positive power;
a second lens having positive power;
a third lens having negative power;
a fourth lens having positive power; and
a fifth lens having negative power,
the first, second, third, fourth, and fifth lenses being arranged in this order such that the first lens is located closer to the object than any other lens of the third lens group is.

6. The zoom lens system of claim 5, wherein
the zoom lens system satisfies the following Inequality (3):

$$Nd\ G31 > 1.85 \tag{3}$$

where Nd_G31 is a refractive index of the first lens of the third lens group, the first lens being located closer to the object than any other lens of the third lens group is.

7. The zoom lens system of claim 5, wherein
while the zoom lens system is focusing from an infinity focus point through a shortest shooting range:
(a) the fifth lens group having negative power moves toward the image, and
the following lens group includes a sixth lens group having negative power, the sixth lens group being adjacent to the fifth lens group and located closer to the image than the fifth lens group, the sixth lens group moving toward the object, or
(b) the fifth lens group having negative power moves toward the image, and
a lens group having negative power and located closer to the image than any other lens group in the zoom lens system moves toward the image.

8. The zoom lens system of claim 5, wherein
the zoom lens system satisfies the following Inequality (4):

$$0.3 < TH\_LIL2/TH\_G1 < 0.55 \tag{4}$$

where TH_LIL2 is an interval, measured along an optical axis, between a surface, facing the object, of a first lens located closer to the object than any other lens in the first lens group and a surface, facing the image, of a second lens adjacent to the first lens and located closer to the image than the first lens is, and TH_G1 is a thickness of the first lens group.

9. The zoom lens system of claim 5, wherein
two focus lens groups moving while the zoom lens system is focusing satisfy the following Inequality (5):

$$0.3 < f\_GR/f\_GF < 5.0 \tag{5}$$

where f_GF is a focal length of the fifth lens group and f_GR is a focal length of a lens group included in the following lens group and moving while the zoom lens system is focusing.

10. The zoom lens system of claim 5, wherein
the zoom lens system satisfies the following Inequality (6):

$$0.01 < THair\_G3G4/fT < 0.30 \tag{6}$$

where THair G3G4 is an air gap, measured at a wide-angle end, between a surface located closest to the image in the third lens group and a surface located closest to the object in the fourth lens group, and fT is a focal length of the zoom lens system at a telephoto end.

11. The zoom lens system of claim 5, wherein
the zoom lens system satisfies the following Inequality (7):

$$0.05 < TH\_FB/L\_W < 0.5 \tag{7}$$

where TH FB is an interval between a surface, facing the image, of a lens located closest to the image in a lens group located closest to the image and an image plane, and L_W is an interval, measured at a wide-angle end, from a lens surface located closest to the object to an image capturing plane.

12. A camera system comprising:
an interchangeable lens unit including the zoom lens system of claim 4; and
a camera body including a camera mount and an image sensor and configured to be connected removably to the interchangeable lens unit via the camera mount,
the image sensor being configured to receive an optical image formed by the zoom lens system and transform the optical image into an electrical image signal,
the interchangeable lens unit forming the optical image of the object on the image sensor.

13. An image capture device configured to transform an optical image of the object into an electrical image signal and display and/or store the image signal transformed, the image capture device comprising:
the zoom lens system of claim 4 configured to form the optical image of the object; and
an image sensor configured to transform the optical image formed by the zoom lens system into the electrical image signal.

* * * * *